US012554217B2

(12) United States Patent
Watanabe et al.

(10) Patent No.: US 12,554,217 B2
(45) Date of Patent: Feb. 17, 2026

(54) PRESSURE SWITCHING DEVICE, IMAGE FORMING APPARATUS, AND PRESSURE SWITCHING METHOD

(71) Applicants: Natsuki Watanabe, Kanagawa (JP); Hitoshi Fujiwara, Kanagawa (JP); Yuusuke Furuichi, Kanagawa (JP); Yutaka Ikebuchi, Kanagawa (JP)

(72) Inventors: Natsuki Watanabe, Kanagawa (JP); Hitoshi Fujiwara, Kanagawa (JP); Yuusuke Furuichi, Kanagawa (JP); Yutaka Ikebuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/977,921

(22) Filed: Dec. 12, 2024

(65) Prior Publication Data

US 2025/0208543 A1 Jun. 26, 2025

(30) Foreign Application Priority Data

Dec. 25, 2023 (JP) ................................ 2023-218009
Mar. 21, 2024 (JP) ................................ 2024-044595

(51) Int. Cl.
*G03G 15/20* (2006.01)

(52) U.S. Cl.
CPC ....... *G03G 15/2032* (2013.01); *G03G 15/206* (2013.01); *G03G 15/2064* (2013.01); *G03G 2215/2025* (2013.01)

(58) Field of Classification Search
CPC ....... G03G 15/2053; G03G 2215/2035; G03G 15/2064
See application file for complete search history.

(56) References Cited

U.S. PATENT DOCUMENTS

2009/0067902 A1 3/2009 Yoshinaga et al.
2011/0176821 A1* 7/2011 Hase ................. G03G 15/6576 399/68

(Continued)

FOREIGN PATENT DOCUMENTS

JP H07-044054 A 2/1995
JP 2020-024355 A 2/2020

OTHER PUBLICATIONS

Extended European Search Report issued Mar. 17, 2025 in European Patent Application No. 24204460.0, 8 pages.

*Primary Examiner* — Jessica L Eley
(74) *Attorney, Agent, or Firm* — XSENSUS LLP

(57) ABSTRACT

A pressure switching device includes a switch that switches between a pressing state in which a first opposed member presses against a second opposed member with predetermined pressure and a pressure decrease state in which the first opposed member is disposed opposite the second opposed member with no pressure or decreased pressure smaller than the predetermined pressure. A slide aid contacts one of the switch and an operation member as the operation member moves toward the switch. The slide aid is mounted on another one of the switch and the operation member. A vibration isolating member is interposed between the slide aid and the another one of the switch and the operation member. The slide aid has a hardness that is greater than a hardness of the vibration isolating member.

12 Claims, 25 Drawing Sheets

(56) References Cited

U.S. PATENT DOCUMENTS

| | | | | |
|---|---|---|---|---|
| 2015/0098735 | A1 * | 4/2015 | Sawamura ......... | G03G 15/2032 399/329 |
| 2020/0033764 | A1 | 1/2020 | Kajiyama et al. | |
| 2023/0297017 | A1 | 9/2023 | Watanabe et al. | |

* cited by examiner

PRESSURE SWITCHING DEVICE, IMAGE FORMING APPARATUS, AND PRESSURE SWITCHING METHOD

CROSS-REFERENCE TO RELATED APPLICATIONS

This patent application is based on and claims priority pursuant to 35 U.S.C. § 119(a) to Japanese Patent Application Nos. 2023-218009, filed on Dec. 25, 2023, and 2024-044595, filed on Mar. 21, 2024, in the Japan Patent Office, the entire disclosure of each of which is hereby incorporated by reference herein.

BACKGROUND

Technical Field

Embodiments of this disclosure relate to a pressure switching device, an image forming apparatus, and a pressure switching method, and more particularly, to a pressure switching device, an image forming apparatus incorporating the pressure switching device, and a pressure switching method performed by the pressure switching device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses are installed with a pressure switching device that switches between a pressing state and a pressure decrease state. In the pressing state, two elements contact each other with pressure therebetween. In the pressure decrease state, the two elements separate from each other or contact each other with decreased pressure therebetween.

SUMMARY

This specification describes below an improved pressure switching device. In one embodiment, the pressure switching device switches pressure applied between a first opposed member and a second opposed member. The pressure switching device includes a first fulcrum and a switch that pivots about the first fulcrum. The switch switches between a pressing state in which the first opposed member presses against the second opposed member with predetermined pressure and a pressure decrease state in which the first opposed member is disposed opposite the second opposed member with one of no pressure and decreased pressure smaller than the predetermined pressure between the first opposed member and the second opposed member. The pressure switching device further incudes a second fulcrum and an operation member that pivots about the second fulcrum. The operation member pivots the switch about the first fulcrum. The pressure switching device further includes a slide aid that contacts one of the switch and the operation member as the operation member moves toward the switch. The slide aid is mounted on another one of the switch and the operation member. The pressure switching device further includes a vibration isolating member that is interposed between the slide aid and the another one of the switch and the operation member. The slide aid has a hardness that is greater than a hardness of the vibration isolating member.

This specification further describes an improved image forming apparatus. In one embodiment, the image forming apparatus includes a first rotator, a second rotator that is disposed opposite the first rotator, and a pressure switching device. The pressure switching device switches pressure applied between the first rotator and the second rotator. The pressure switching device includes a first fulcrum and a switch that pivots about the first fulcrum. The switch switches between a pressing state in which the first rotator presses against the second rotator with predetermined pressure and a pressure decrease state in which the first rotator is disposed opposite the second rotator with one of no pressure and decreased pressure smaller than the predetermined pressure between the first rotator and the second rotator. The pressure switching device further incudes a second fulcrum and an operation member that pivots about the second fulcrum. The operation member pivots the switch about the first fulcrum. The pressure switching device further includes a slide aid that contacts one of the switch and the operation member as the operation member moves toward the switch. The slide aid is mounted on another one of the switch and the operation member. The pressure switching device further includes a vibration isolating member that is interposed between the slide aid and the another one of the switch and the operation member. The slide aid has a hardness that is greater than a hardness of the vibration isolating member.

This specification further describes an improved pressure switching method. In one embodiment, the pressure switching method includes pressing a first opposed member against a second opposed member, pivoting an operation member to pivot a switch in a first pivot direction, decreasing pressure applied to the second opposed member by the first opposed member, pivoting the operation member to pivot the switch in a second pivot direction, and sliding one of the switch and the operation member over a slide aid mounted on a vibration isolating member mounted on another one of the switch and the operation member.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
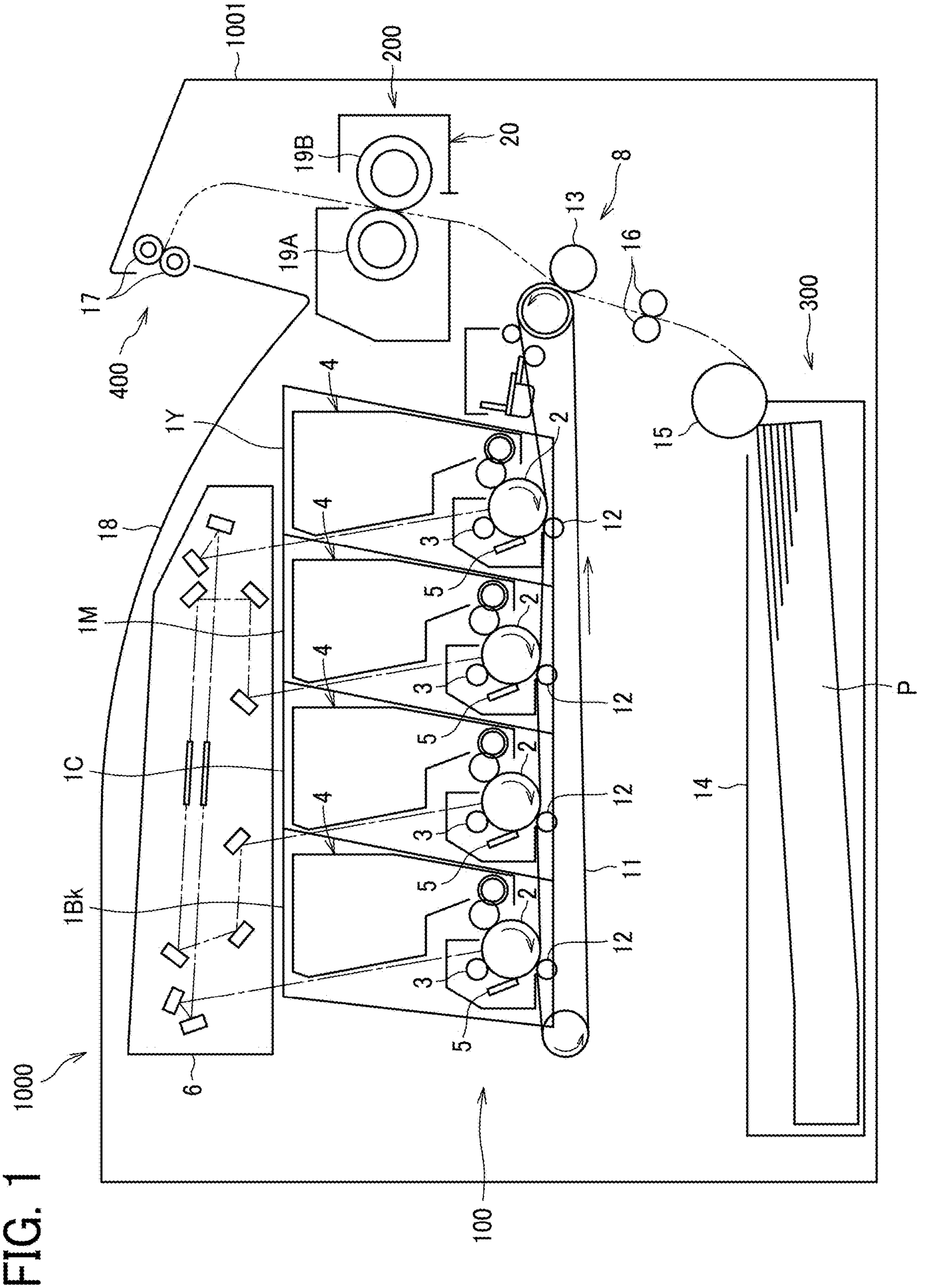
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes the embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

A description is provided of an overall construction of an image forming apparatuses 1000.

FIG. 1 is a schematic cross-sectional view of the image forming apparatus 1000 according to a first embodiment of the present disclosure. The image forming apparatus 1000 is a printer. Alternatively, the image forming apparatus 1000 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns.

Referring to FIG. 1, a description is provided of the overall construction and operation of the image forming apparatus 1000 according to the first embodiment of the present disclosure.

As illustrated in FIG. 1, the image forming apparatus 1000 according to the first embodiment of the present disclosure includes an image forming portion 100, a fixing portion 200, a sheet supply portion 300, and a sheet ejecting portion 400.

A description is provided of a construction of the image forming portion 100.

The image forming portion 100 forms a toner image on a sheet P serving as a recording medium. The image forming portion 100 includes four image forming units 1Y, 1M, 1C, and 1Bk, an exposure device 6, and a transfer device 8.

Each of the four image forming units 1Y, 1M, 1C, and 1Bk includes an electrostatic latent image bearer 2, a charger 3, a developing device 4, and a cleaner 5.

The electrostatic latent image bearer 2 serves as a rotator that bears an electrostatic latent image on a surface of the electrostatic latent image bearer 2. For example, the electrostatic latent image bearer 2 is a photoconductive drum, an endless photoconductive belt, or the like.

The charger 3 charges the surface of the electrostatic latent image bearer 2. Types of the charger 3 are not limited and are selected properly depending on a purpose as long as the charger 3 applies a voltage onto the surface of the electrostatic latent image bearer 2, thus uniformly charging the surface of the electrostatic latent image bearer 2. For example, the charger 3 is a contact type charger such as a conductive or semiconductive charging roller, a magnetic brush, a fur brush, film, and a rubber blade or a non-contact type charger using corona discharge.

The developing device 4 supplies toner serving as a developer to the electrostatic latent image formed on the electrostatic latent image bearer 2 to form a toner image. The developing devices 4 of the image forming units 1Y, 1M, 1C, and 1Bk contain toners, serving as developers, in different colors, that is, yellow, magenta, cyan, and black, respectively, which correspond to color separation components for a color image.

The cleaner 5 removes residual toner and other foreign substance that remain on the electrostatic latent image bearer 2 therefrom. The cleaner 5 is a cleaning blade or the like that contacts the surface of the electrostatic latent image bearer 2.

The exposure device 6 exposes the charged surface of each of the electrostatic latent image bearers 2 and forms an electrostatic latent image thereon. Types of the exposure device 6 are not limited and are selected properly depending on a purpose as long as the exposure device 6 exposes the charged surface of each of the electrostatic latent image bearers 2. For example, the exposure device 6 employs a duplication optical system, a rod lens array system, a laser optical system, a liquid crystal shutter optical system, a light-emitting diode (LED) optical system, or the like.

The transfer device 8 transfers the toner image onto the sheet P. The transfer device 8 includes an intermediate transfer belt 11, four primary transfer rollers 12, and a secondary transfer roller 13. The intermediate transfer belt 11 is an endless belt that is stretched taut across a plurality of support rollers. The four primary transfer rollers 12 are disposed within a loop formed by the intermediate transfer belt 11. The primary transfer rollers 12 press against the electrostatic latent image bearers 2, respectively, via the intermediate transfer belt 11, thus forming primary transfer nips between the intermediate transfer belt 11 and the electrostatic latent image bearers 2. The secondary transfer roller 13 contacts an outer circumferential surface of the intermediate transfer belt 11, thus, forming a secondary transfer nip between the secondary transfer roller 13 and the intermediate transfer belt 11.

A description is provided of a construction of the fixing portion 200.

The fixing portion 200 includes a fixing device 20 that heats the sheet P, fixing the toner image on the sheet P. The fixing device 20 is one example of a heating device that heats the sheet P. For example, the fixing device 20 includes a pair of rotators, that is, a first rotator 19A and a second rotator 19B, and a heater. The first rotator 19A contacts the second rotator 19B. The heater heats at least one of the first rotator 19A or the second rotator 19B.

A description is provided of a construction of the sheet supply portion 300.

The sheet supply portion 300 supplies the sheet P to the image forming portion 100. The sheet supply portion 300 includes a sheet tray 14 and a feed roller 15. The sheet tray 14 loads a plurality of sheets P. The feed roller 15 picks up and feeds a sheet P from the sheet tray 14. According to the embodiments below, a sheet (e.g., a sheet P) is used as a recording medium. However, the recording medium is not limited to paper as the sheet. For example, in addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

A description is provided of a construction of the sheet ejecting portion 400.

The sheet ejecting portion 400 ejects the sheet P onto an outside of the image forming apparatus 1000. The sheet ejecting portion 400 includes an output roller pair 17 and an output tray 18. The output roller pair 17 ejects the sheet P onto the output tray 18. The output tray 18 is placed with the sheet P ejected by the output roller pair 17. The image forming apparatus 1000 further includes a timing roller pair 16.

Referring to FIG. 1, a description is provided of image forming processes performed by the image forming apparatus 1000 according to the first embodiment of the present disclosure.

As the image forming apparatus 1000 receives an instruction from a control panel or an external terminal and starts a print job, a driver starts rotating the electrostatic latent image bearer 2 of each of the image forming units 1Y, 1M, 1C, and 1Bk clockwise in FIG. 1. Subsequently, the charger 3 uniformly charges the surface of the electrostatic latent image bearer 2 at a high electric potential. The exposure device 6 exposes the charged surfaces of the electrostatic latent image bearers 2, respectively, according to image data (e.g., print data) sent from the external terminal. Alternatively, if the image forming apparatus 1000 is a copier, the exposure device 6 exposes the charged surfaces of the electrostatic latent image bearers 2, respectively, according to image data created by a scanner that reads an image on an original. Accordingly, the electric potential of an exposed portion on the surface of each of the electrostatic latent image bearers 2 decreases, forming an electrostatic latent image on the surface of each of the electrostatic latent image bearers 2. Thereafter, the developing devices 4 supply toner to the electrostatic latent images formed on the electrostatic latent image bearers 2, respectively, thus forming toner images in different colors, that is, yellow, magenta, cyan, and black toner images, on the electrostatic latent image bearers 2.

The toner images formed on the electrostatic latent image bearers 2 travel and reach the primary transfer nips defined by the primary transfer rollers 12 in accordance with rotation of the electrostatic latent image bearers 2, respectively. The primary transfer rollers 12 transfer the toner images formed on the electrostatic latent image bearers 2 onto the intermediate transfer belt 11 driven and rotated counterclockwise in FIG. 1 successively at the primary transfer nips such that the toner images are superimposed on the intermediate transfer belt 11. Thus, the superimposed toner images form a full color toner image on the intermediate transfer belt 11. The four image forming units 1Y, 1M, 1C, and 1Bk form the full color toner image. Alternatively, one of the four image forming units 1Y, 1M, 1C, and 1Bk may be used to form a monochrome toner image or two or three of the four image forming units 1Y, 1M, 1C, and 1Bk may be used to form a bicolor toner image or a tricolor toner image. After the toner image formed on the electrostatic latent image bearer 2 is transferred onto the intermediate transfer belt 11, the cleaner 5 cleans the electrostatic latent image bearer 2. For example, the cleaner 5 removes a foreign substance such as residual toner from the surface of the electrostatic latent image bearer 2.

The full color toner image formed on the intermediate transfer belt 11 is conveyed to the secondary transfer nip defined by the secondary transfer roller 13 in accordance with rotation of the intermediate transfer belt 11. The secondary transfer roller 13 transfers the full color toner image formed on the intermediate transfer belt 11 onto a sheet P at the secondary transfer nip. The sheet P is supplied from the sheet supply portion 300. After the image forming apparatus 1000 starts the print job, the feed roller 15 rotates to pick up and feed the sheet P from the sheet tray 14. As the sheet P fed by the feed roller 15 comes into contact with the timing roller pair 16 before the sheet P reaches the secondary transfer nip, the timing roller pair 16 temporarily interrupts conveyance of the sheet P. Thereafter, the timing roller pair 16 resumes rotation at a predetermined time, conveying the sheet P to the secondary transfer nip at a proper time when the full color toner image formed on the intermediate transfer belt 11 reaches the secondary transfer nip. The secondary transfer roller 13 transfers the full color toner image onto the sheet P.

The sheet P transferred with the full color toner image is conveyed to the fixing portion 200. While the sheet P passes through a fixing nip formed between the first rotator 19A and the second rotator 19B that rotate, the first rotator 19A and the second rotator 19B fix the full color toner image on the sheet P under heat and pressure. Thereafter, the sheet P is conveyed to the sheet ejecting portion 400 where the output roller pair 17 ejects the sheet P onto the output tray 18. Thus, a series of image forming processes is finished.

A description is provided of a basic construction of the fixing device 20.

Figure 2:
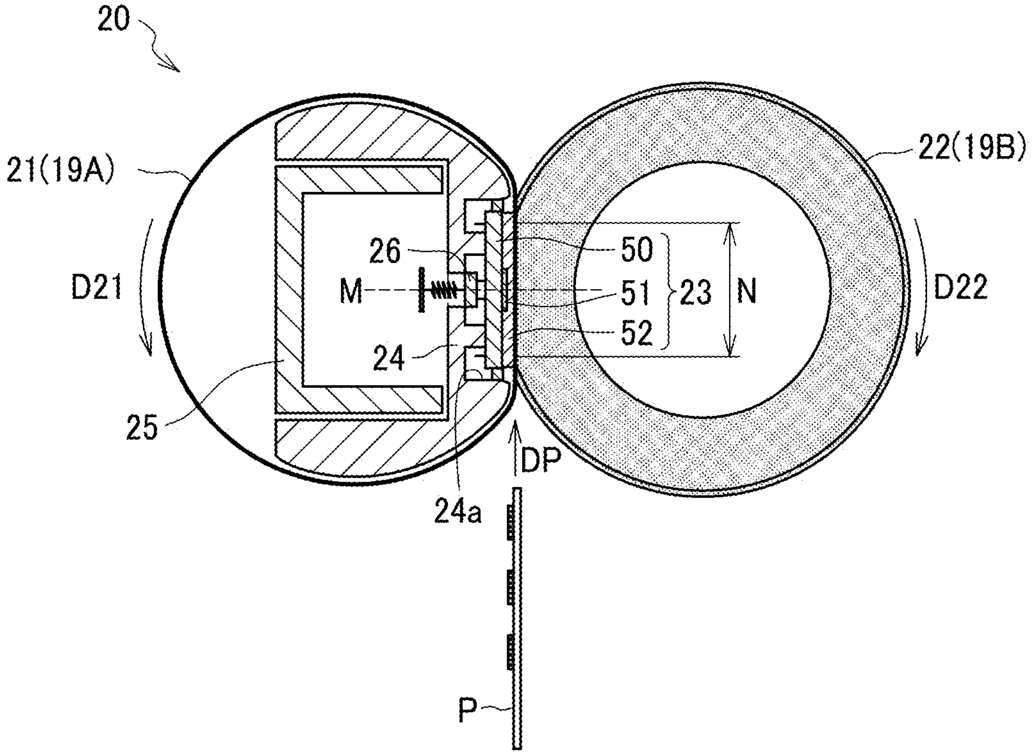
FIG. 2 is a schematic cross-sectional view of a fixing device according to an embodiment of the present disclosure, that is incorporated in the image forming apparatus depicted in FIG. 1, illustrating a basic construction of the fixing device.

FIG. 2 is a cross-sectional view of the fixing device 20 according to the first embodiment of the present disclosure, illustrating the basic construction of the fixing device 20.

As illustrated in FIG. 2, in addition to the first rotator 19A and the second rotator 19B, the fixing device 20 includes a heater 23, a heater holder 24, a stay 25, and a temperature sensor 26.

One of the first rotator 19A and the second rotator 19B, that is, the first rotator 19A, is a fixing belt 21 that is disposed opposite an unfixed toner image bearing side of the sheet P, that bears an unfixed toner image. Another one of the first rotator 19A and the second rotator 19B, that is, the second rotator 19B, is a pressure roller 22 that is disposed opposite the fixing belt 21. A spring serving as a biasing member causes the fixing belt 21 and the pressure roller 22 to press against and contact with each other, forming a fixing nip N between the fixing belt 21 and the pressure roller 22.

The fixing belt 21 is an endless belt that includes a base layer that is tubular and a release layer that is disposed on an outer circumferential face of the base layer. For example, the base layer is made of a metal material such as nickel and stainless steel or a resin material such as polyimide. The release layer is made of perfluoroalkoxy alkane (PFA), polytetrafluoroethylene (PTFE), polyimide, polyether imide, polyether sulfone (PES), or the like. As the fixing belt 21 incorporates the release layer, the release layer facilitates separation of toner of the toner image formed on the sheet P from the fixing belt 21, preventing the sheet P from being wound around the fixing belt 21. The fixing belt 21 may further include an elastic layer that is interposed between the base layer and the release layer. For example, the elastic layer is made of a rubber material such as silicone rubber, silicone rubber foam, and fluororubber. In a case that the fixing belt 21 incorporates the elastic layer, the elastic layer prevents slight surface asperities from being produced on a surface of the fixing belt 21. Accordingly, heat is quickly conducted from the fixing belt 21 to the toner image on the sheet P evenly, improving fixing quality.

The pressure roller 22 includes a core metal that is hollow or solid, an elastic layer that is disposed on an outer circumferential face of the core metal, and a release layer that is disposed on an outer circumferential face of the elastic layer. The core metal is made of a metal material such as iron. The elastic layer is made of silicone rubber, silicone rubber foam, fluororubber, or the like. The release layer is made of fluororesin such as PFA and PTFE.

The heater 23 serves as a heat source that heats the fixing belt 21. The heater 23 is a laminated heater or a plate heater that contacts an inner circumferential face of the fixing belt 21. The heater 23 contacts the inner circumferential face of the fixing belt 21 at an opposed position where the fixing belt 21 is disposed opposite the pressure roller 22. Accordingly, the fixing nip N is formed between the fixing belt 21 and the pressure roller 22. The heater 23 contacts the inner circumferential face of the fixing belt 21 directly. Alternatively, the heater 23 may be disposed opposite the inner circumferential face of the fixing belt 21 indirectly via a low-friction slide sheet or the like.

The heater 23 includes a base 50, resistive heat generators 51, and an insulating layer 52. The resistive heat generators 51 are disposed on the base 50 and covered by the insulating layer 52. As the resistive heat generators 51 generate heat when the heater 23 is energized, heat generated by the resistive heat generators 51 is conducted to the inner circumferential face of the fixing belt 21 through the insulating layer 52. Thus, the resistive heat generators 51 heat the fixing belt 21. Alternatively, the heater 23 may be oriented differently such that the base 50 contacts the inner circumferential face of the fixing belt 21.

For example, the base 50 is made of ceramics, such as alumina and aluminum nitride, or a nonmetallic material, such as glass and mica, having an enhanced heat resistance and an enhanced insulation. Alternatively, the heater 23 may further include an insulating layer that is interposed between the base 50 and the resistive heat generators 51. Hence, the base 50 may be made of a conductive material such as metal. The metal is preferably aluminum, stainless steel, or the like that is available at reduced costs. In order to suppress uneven temperature of the heater 23 and improve quality of the toner image formed on the sheet P, the base 50 may be made of a material that has an increased thermal conductivity such as copper, graphite, and graphene. Graphene is a substance produced with carbon atoms combined into a sheet shape.

The resistive heat generators 51 are produced by screen printing or the like. For example, each of the resistive heat generators 51 is produced as below. Silver-palladium (AgPd), glass powder, and the like are mixed into paste. The paste coats the base 50 by screen printing or the like. Thereafter, the base 50 is subject to firing. Thus, the resistive heat generator 51 is produced. Alternatively, each of the resistive heat generators 51 may be made of a resistive material such as a silver alloy (AgPt) and ruthenium oxide ($RuO_2$) instead of silver-palladium. For example, the insulating layer 52 is made of heat-resistant glass or the like.

The heater holder 24 serves as a heat source holder that holds the heater 23. The heater holder 24 includes a recess 24*a* that accommodates the heater 23. Accordingly, the recess 24*a* restricts motion of the heater 23 in a vertical direction in FIG. 2 and a direction perpendicular to a paper surface of FIG. 2. Since the heater holder 24 is subject to a high temperature by heat from the heater 23, the heater holder 24 is preferably made of a heat-resistant material. In a case that the heater holder 24 is made of heat-resistant resin having a decreased thermal conductivity, such as liquid crystal polymer (LCP), the heater holder 24 suppresses redundant conduction of heat from the heater 23 to the heater holder 24, improving efficiency in heating of the fixing belt 21 by the heater 23.

The stay 25 serves as a support that supports the heater holder 24. The stay 25 supports an opposite face of the heater holder 24, that is opposite to a pressure roller opposed face of the heater holder 24, that is disposed opposite the pressure roller 22. Hence, the stay 25 prevents the heater 23 from being bent by pressure from the pressure roller 22. Thus, the stay 25 causes the heater 23 to form the fixing nip N that has an even width in a sheet conveyance direction DP throughout an entire span of the fixing belt 21 in a longitudinal direction thereof. The stay 25 is preferably made of a ferrous metal material such as stainless used steel (SUS) and steel electrolytic cold commercial (SECC) to achieve rigidity.

The temperature sensor 26 serves as a temperature detector that detects a temperature of the heater 23. The temperature sensor 26 depicted in FIG. 2 is a contact type sensor that contacts the heater 23 directly and detects the temperature of the heater 23. Alternatively, the temperature sensor 26 may be disposed opposite the heater 23 indirectly via other element such as a thermal conductor.

A description is provided of operation of the fixing device 20 according to the first embodiment of the present disclosure.

As the image forming apparatus 1000 starts a print job, a driver starts rotating the pressure roller 22 in a rotation direction D22. The pressure roller 22 drives and rotates the fixing belt 21 in a rotation direction D21. A power supply starts supplying power to the heater 23, causing the heater 23 to heat the fixing belt 21. When the heater 23 heats the fixing belt 21 to a predetermined target temperature, a sheet P bearing an unfixed toner image is conveyed to the fixing nip N. While the sheet P passes through the fixing nip N, the fixing belt 21 and the pressure roller 22 heat and press the sheet P. Thus, the fixing belt 21 and the pressure roller 22 fix the unfixed toner image on the sheet P. Thereafter, the sheet P is discharged from the fixing nip N and is conveyed to the sheet ejecting portion 400.

A description is provided of a construction of the heater 23.

Figure 3:
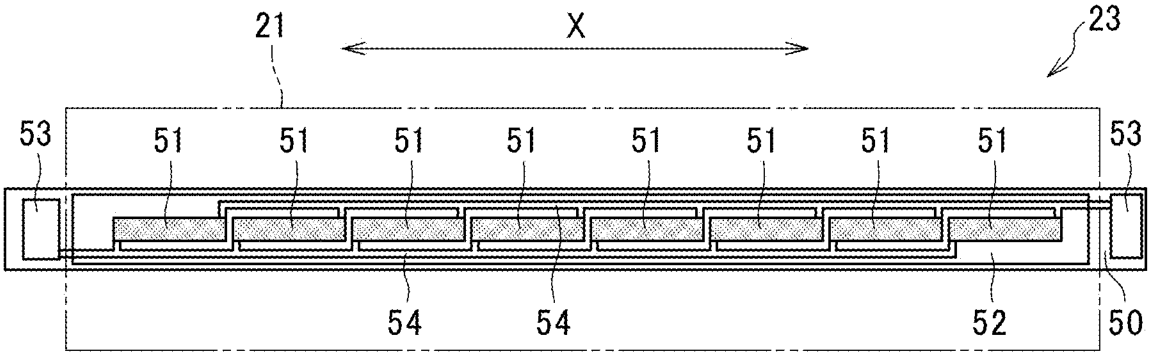
FIG. 3 is a plan view of a heater incorporated in the fixing device depicted in FIG. 2.

FIG. 3 is a plan view of the heater 23 according to the first embodiment of the present disclosure.

As illustrated in FIG. 3, in addition to the base 50, the resistive heat generators 51, and the insulating layer 52, the heater 23 according to the first embodiment of the present disclosure includes a pair of electrodes 53 and a plurality of feeders 54. The base 50 is an elongated plate. The base 50 has a longitudinal direction that is parallel to a longitudinal direction X of the fixing belt 21. The plurality of resistive heat generators 51 is arranged in the longitudinal direction of the base 50 (e.g., the longitudinal direction X) with a gap between the adjacent resistive heat generators 51. The adjacent resistive heat generators 51 define the gap therebetween, that is 0.2 mm or greater, preferably 0.4 mm or greater, in view of ensuring insulation between the adjacent resistive heat generators 51. If the gap between the adjacent resistive heat generators 51 is excessively great, the fixing belt 21 is subject to temperature decrease at an opposed portion thereof that is disposed opposite the gap. Hence, the gap between the adjacent resistive heat generators 51 is 5 mm or smaller, preferably 1 mm or smaller.

The electrodes 53 are mounted on both lateral ends of the base 50 in the longitudinal direction thereof, respectively. The electrodes 53 are electrically connected to the plurality of resistive heat generators 51 through the plurality of feeders 54. The plurality of resistive heat generators 51 is electrically connected in parallel to the electrodes 53.

In order to ensure insulation and durability, the insulating layer 52 covers the feeders 54 like the resistive heat generators 51. Conversely, since each of the electrodes 53 is connected to a connector serving as a feeding member, each of the electrodes 53 is not covered by the insulating layer 52 and is exposed. As the connector is connected to each of the electrodes 53, the power supply (e.g., an alternating current power supply) disposed inside an apparatus body 1001 of the image forming apparatus 1000 depicted in FIG. 1 is ready to supply power to the plurality of resistive heat generators 51. Each of the resistive heat generators 51, the electrodes 53, and the feeders 54 has a position, a number, a shape, and the like that are not limited to a position, a number, a shape, and the like depicted in FIG. 3 and are modified properly.

A description is provided of a construction of a temperature control mechanism.

Figure 4:
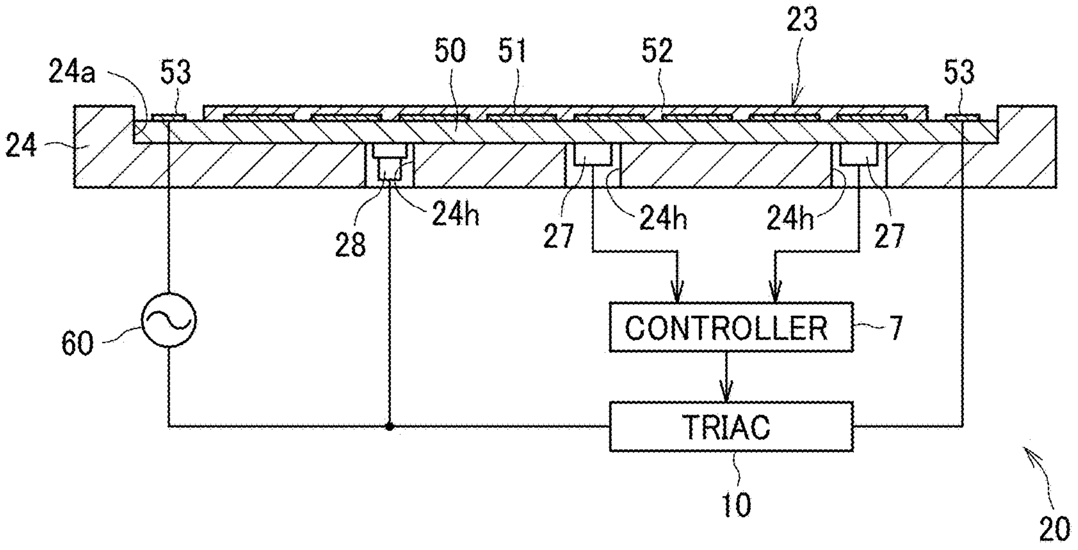
FIG. 4 is a diagram of a temperature control mechanism that controls a temperature of the heater depicted in FIG. 3.

FIG. 4 is a diagram of the temperature control mechanism that controls a temperature of the heater 23 according to the first embodiment of the present disclosure, illustrating the construction of the temperature control mechanism.

As illustrated in FIG. 4, the fixing device 20 according to the first embodiment of the present disclosure includes, as the temperature control mechanism that controls the temperature of the heater 23, thermistors 27, a thermostat 28, a triac 10, and a controller 7.

Each of the thermistors 27 and the thermostat 28 is one example of the temperature sensor 26 depicted in FIG. 2 that detects the temperature of the heater 23. Each of the thermistors 27 is a temperature sensor for temperature control to retain a predetermined temperature of the heater 23. The thermostat 28 is a temperature sensor for preventing overheating of the heater 23. The thermistors 27 and the thermostat 28 contact a back face of the heater 23 through three through holes 24*h* penetrating through the heater holder 24, respectively. The back face of the heater 23 is opposite to a contact face of the heater 23, that contacts the fixing belt 21.

The triac 10 serves as an energization controller that controls an energization duty cycle at which an alternating current power supply 60 supplies power to the heater 23 according to an instruction from the controller 7. The energization duty cycle defines a ratio of an energization time for which the alternating current power supply 60 supplies power to the heater 23 per control cycle. The controller 7 includes a microcomputer that includes a central processing unit (CPU), a read only memory (ROM), a random access memory (RAM), and an input-output (I/O) interface. The controller 7 controls operation of an entirety of the image forming apparatus 1000 including the fixing device 20. The controller 7 outputs a control signal that controls the triac 10 based on temperatures of the heater 23, that are detected by the thermistors 27, respectively. The triac 10 controls the energization duty cycle based on the control signal sent from the controller 7. Thus, the temperature control mechanism retains a predetermined target temperature of the heater 23. In a case that the temperature of the heater 23 reaches an abnormal temperature that is higher than a predetermined upper limit, the thermostat 28 detects temperature increase of the heater 23 and interrupts power supply to the heater 23.

A description is provided of a construction of a pressure switching device 30.

Figure 5:
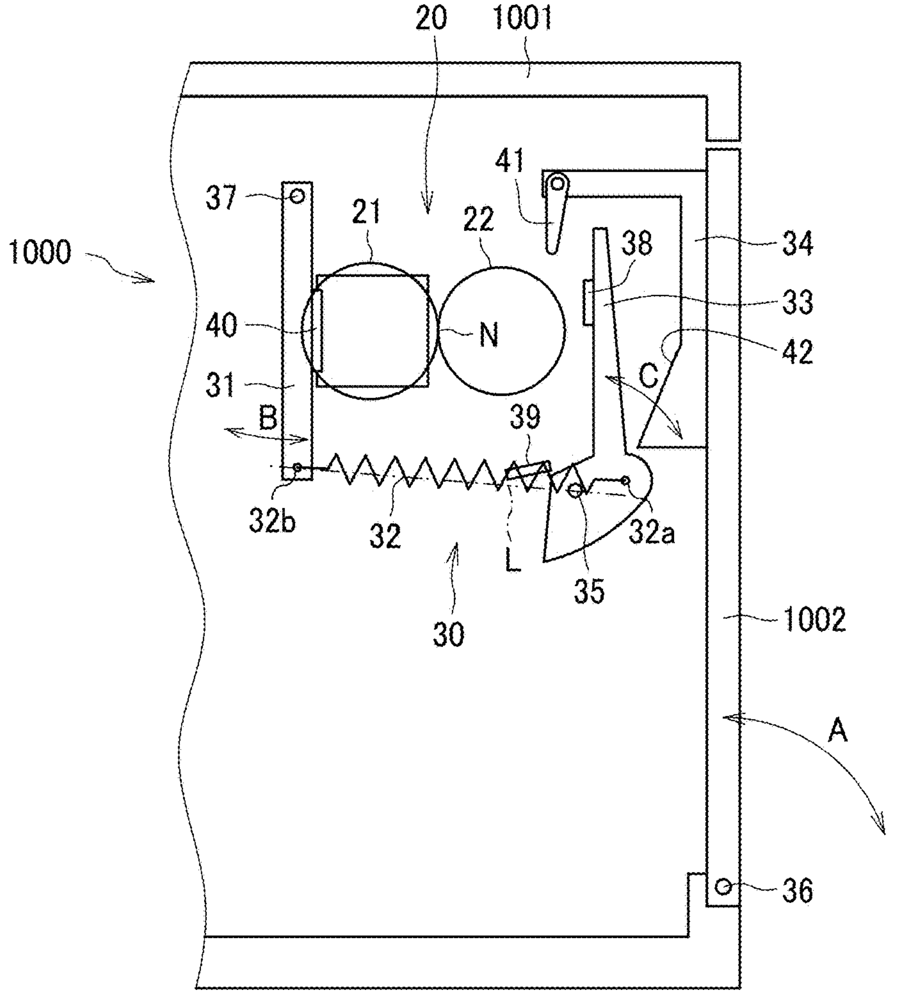
FIG. 5 is a partial cross-sectional view of the image forming apparatus depicted in FIG. 1, illustrating a pressure switching device incorporated therein.

FIG. 5 is a partial cross-sectional view of the image forming apparatus 1000 according to the first embodiment of the present disclosure, illustrating the construction of the pressure switching device 30 incorporated in the image forming apparatus 1000.

The image forming apparatus 1000 according to the first embodiment of the present disclosure includes the pressure switching device 30 that switches between a pressing state in which the fixing belt 21 is pressed against the pressure roller 22 with predetermined pressure and a pressure decrease state in which the fixing belt 21 is pressed against the pressure roller 22 with decreased pressure smaller than the predetermined pressure. For example, the pressure switching device 30 includes a presser 31, a pressure spring 32, a switch 33, and an operation member 34.

The presser 31, the pressure spring 32, and the switch 33 are disposed inside the apparatus body 1001 or a device body of the fixing device 20 serving as the heating device. The image forming apparatus 1000 further includes a cover 1002 and a fulcrum 36. Conversely, the operation member 34 is mounted on the cover 1002 that is opened and closed by an operator (e.g., a user or a service engineer). The cover 1002 pivots about the fulcrum 36 mounted on the apparatus body 1001 in a pivot direction A depicted in FIG. 5. Hence, as the cover 1002 pivots about the fulcrum 36, the operation member 34 also pivots about the fulcrum 36 together with the cover 1002.

The fixing device 20 further includes a frame 40 (e.g., a side plate) that supports the fixing belt 21. The presser 31 presses the frame 40. For example, the pressure switching device 30 further includes a fulcrum 37 that is mounted on the apparatus body 1001. The presser 31 pivots about the fulcrum 37 in a pivot direction B depicted in FIG. 5. As the presser 31 pivots about the fulcrum 37 counterclockwise in FIG. 5 toward the pressure roller 22, the presser 31 presses the frame 40 toward the pressure roller 22. Accordingly, the frame 40 presses the fixing belt 21 against the pressure roller 22 in the pressing state in which the fixing belt 21 and the pressure roller 22 form the fixing nip N having a predetermined width in the sheet conveyance direction DP depicted in FIG. 2.

The pressure spring 32 serves as a biasing member that biases the presser 31 in a pressing direction, that is, pivots the presser 31 counterclockwise in the pivot direction B, in which the presser 31 presses the frame 40 toward the pressure roller 22. The pressure spring 32 is anchored to and stretched between the presser 31 and the switch 33. Hence, the pressure spring 32 biases the presser 31 in the pressing direction in which the presser 31 presses the fixing belt 21 against the pressure roller 22.

The switch 33 switches between the pressing state and the pressure decrease state of the fixing belt 21 and the pressure roller 22. The pressure switching device 30 further includes a fulcrum 35 that is mounted on the apparatus body 1001. The switch 33 pivots about the fulcrum 35 in a pivot direction C depicted in FIG. 5. The pressure switching device 30 further includes two stoppers 38 and 39 that are disposed inside the apparatus body 1001. The stoppers 38 and 39 halt the switch 33 that pivots at predetermined positions, respectively.

The operation member 34 pivots the switch 33 in accordance with opening and closing of the cover 1002. The operation member 34 includes a hook 41, serving as a first operation portion, and a scoop 42, serving as a second operation portion, that contact and pivot the switch 33.

A description is provided of switching (e.g., a pressure switching method) performed by the pressure switching device 30 according to the first embodiment of the present disclosure.

A description is now given of switching (e.g., a pressure switching method) from the pressing state to the pressure decrease state of the fixing belt 21 and the pressure roller 22.

Figure 6:
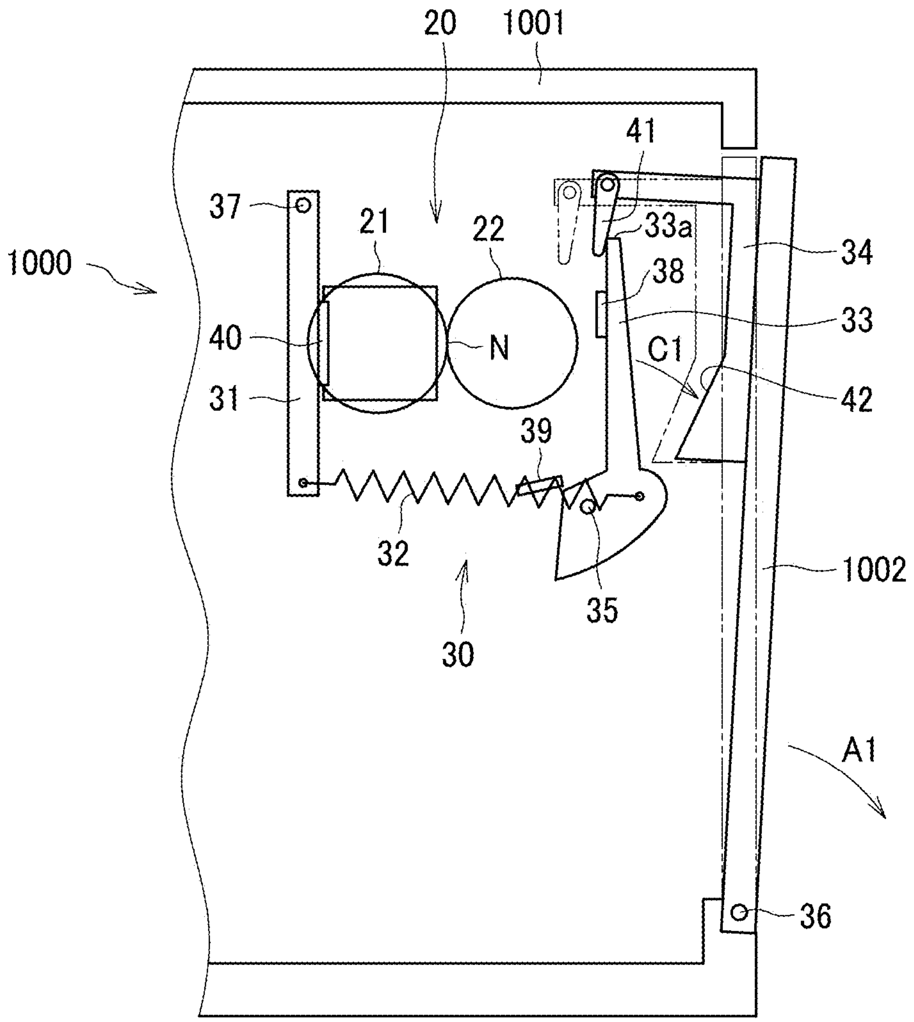
FIG. 6 is a partial cross-sectional view of the image forming apparatus depicted in FIG. 1, illustrating the pressure switching device that performs a first process of switching.

In order to switch to the pressure decrease state of the fixing belt 21 and the pressure roller 22, as illustrated in FIG. 6, the operator pivots and opens the cover 1002 in a pivot direction A1. As the cover 1002 opens, the hook 41 of the operation member 34 comes into contact with a tip 33*a* of the switch 33. Accordingly, the switch 33 is exerted with a force that moves the switch 33 in a pivot direction C1 depicted in FIG. 6.

Figure 7:
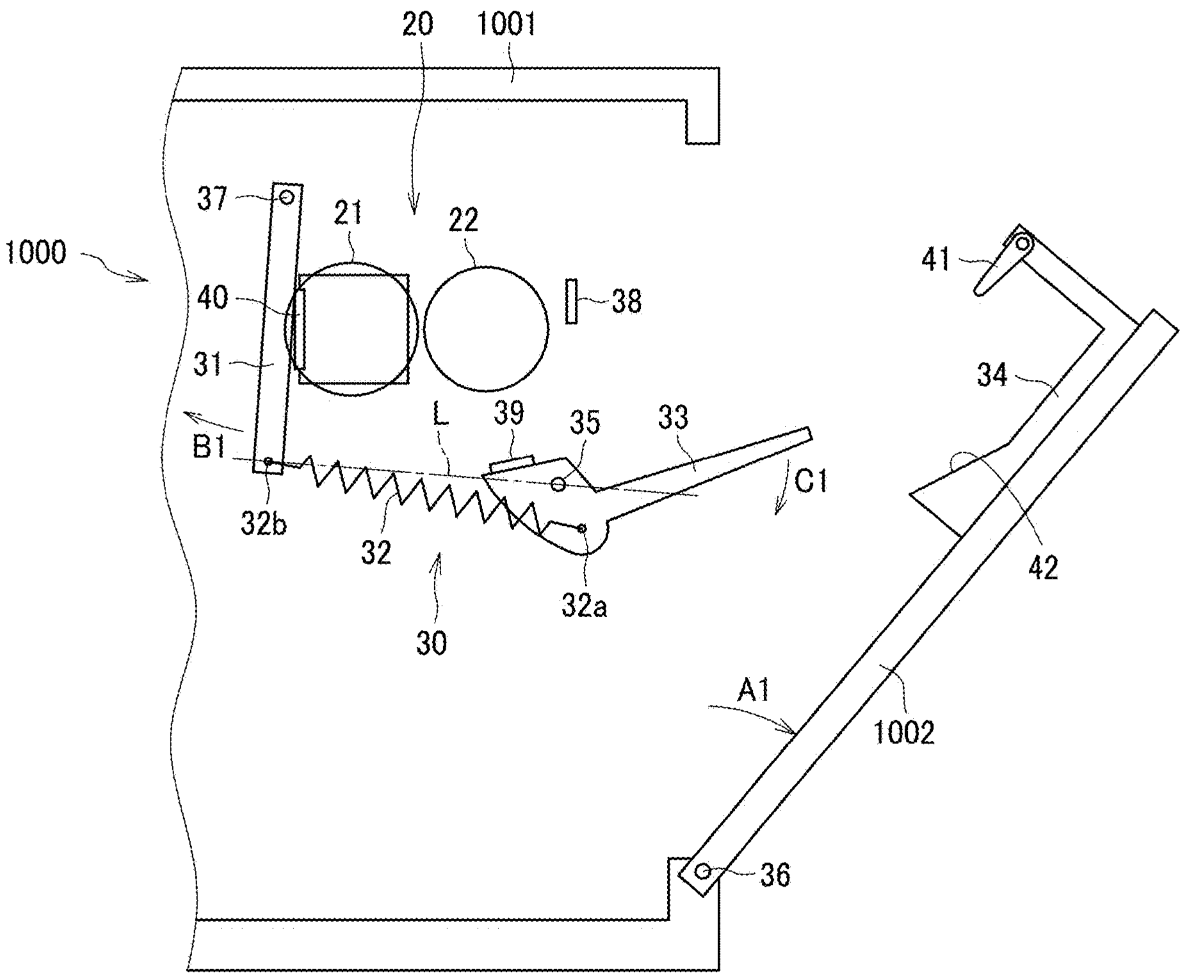
FIG. 7 is a partial cross-sectional view of the image forming apparatus depicted in FIG. 1, illustrating the pressure switching device that performs a second process of switching.

As illustrated in FIG. 7, as the switch 33 pivots in the pivot direction C1, one end 32*a* of the pressure spring 32 anchored to the switch 33 moves downward beyond a line L to an opposite side defined by the line L, that is, a lower side below the line L in FIG. 7. The line L passes through the fulcrum 35 of the switch 33 and another end 32*b* of the pressure spring 32. Accordingly, the switch 33 is exerted with a pivot moment that pivots the switch 33 in the pivot direction C1. Consequently, as the pivot moment biases and pivots the switch 33 in the pivot direction C1, the switch 33 contacts the stopper 39 that retains the switch 33.

In a state in which the stopper 39 retains the switch 33, a distance between the one end 32*a* and the another end 32*b* of the pressure spring 32 is smaller than a distance therebetween before the switch 33 pivots as illustrated in FIG. 5. Accordingly, the pressure spring 32 decreases a tensile force. As the tensile force of the pressure spring 32 decreases, pressure applied to the frame 40 by the presser 31 decreases. Accordingly, the presser 31 pivots in a pivot direction B1 in FIG. 7. Consequently, pressure applied to the pressure roller 22 by the fixing belt 21 decreases. Thus, the presser 31 presses the fixing belt 21 against the pressure roller 22 with decreased pressure in the pressure decrease state.

When the switch 33 switches to the pressure decrease state of the fixing belt 21 and the pressure roller 22, the fixing belt 21 contacts the pressure roller 22 with decreased pressure or no pressure. Hence, the operator removes a sheet P jammed between the fixing belt 21 and the pressure roller 22 readily. The pressure decrease state denotes a state in which the fixing belt 21 separates from the pressure roller 22 with no pressure therebetween. The pressure decrease state also denotes a state in which the fixing belt 21 contacts the pressure roller 22 with decreased pressure smaller than pressure with which the fixing belt 21 presses against the pressure roller 22 in the pressing state. As the switch 33 switches to the pressure decrease state of the fixing belt 21 and the pressure roller 22, the switch 33 also suppresses plastic deformation of the fixing belt 21 and the pressure roller 22, preventing failures such as formation of a faulty toner image due to plastic deformation.

A description is now given of switching (e.g., a pressure switching method) from the pressure decrease state to the pressing state of the fixing belt 21 and the pressure roller 22.

Figure 8:
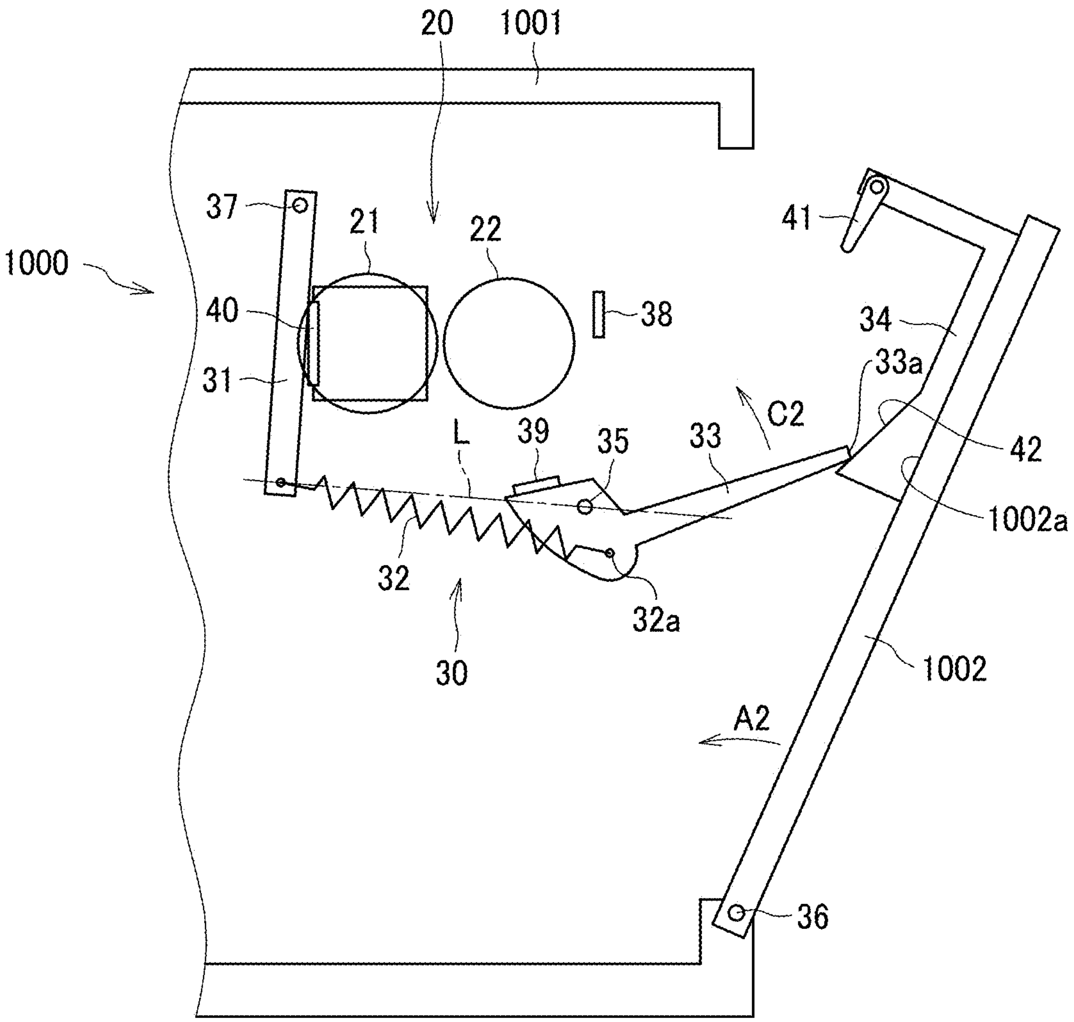
FIG. 8 is a partial cross-sectional view of the image forming apparatus depicted in FIG. 1, illustrating the pressure switching device that performs a third process of switching.

In order to switch to the pressing state of the fixing belt 21 and the pressure roller 22, as illustrated in FIG. 8, the operator pivots and closes the cover 1002 in a pivot direction A2. The operation member 34 pivots and returns the switch 33 to a default position in accordance with closing of the cover 1002. For example, as the operator pivots and closes the cover 1002 in the pivot direction A2, the scoop 42 of the operation member 34 presses against the tip 33*a* of the switch 33. Pressure from the scoop 42 exerts a force that moves and returns the switch 33 in a pivot direction C2 depicted in FIG. 8.

Accordingly, the switch 33 pivots in the pivot direction C2. As the switch 33 pivots in the pivot direction C2, the one end 32*a* of the pressure spring 32 moves upward beyond the line L to an opposite side defined by the line L, that is, an upper side above the line L as illustrated in FIG. 5. Accordingly, the switch 33 is exerted with a pivot moment that pivots the switch 33 in the pivot direction C2. Consequently, as the pivot moment biases and pivots the switch 33 in the pivot direction C2, the switch 33 contacts the stopper 38 that retains the switch 33 as illustrated in FIG. 5.

In a state in which the switch 33 contacts the stopper 38 as illustrated in FIG. 5, the distance between the one end 32*a* and the another end 32*b* of the pressure spring 32 increases. Hence, a tensile force of the pressure spring 32 increases, causing the presser 31 to press the frame 40. Accordingly, the frame 40 presses the fixing belt 21 against the pressure roller 22 in the pressing state in which the fixing belt 21 contacts and presses against the pressure roller 22 with increased pressure.

As described above, according to the first embodiment of the present disclosure, as the operator opens and closes the cover 1002 interlocked with the pressure switching device 30, the switch 33 and the presser 31 of the pressure switching device 30 switch between the pressure decrease state and the pressing state of the fixing belt 21 and the pressure roller 22.

Figure 9:
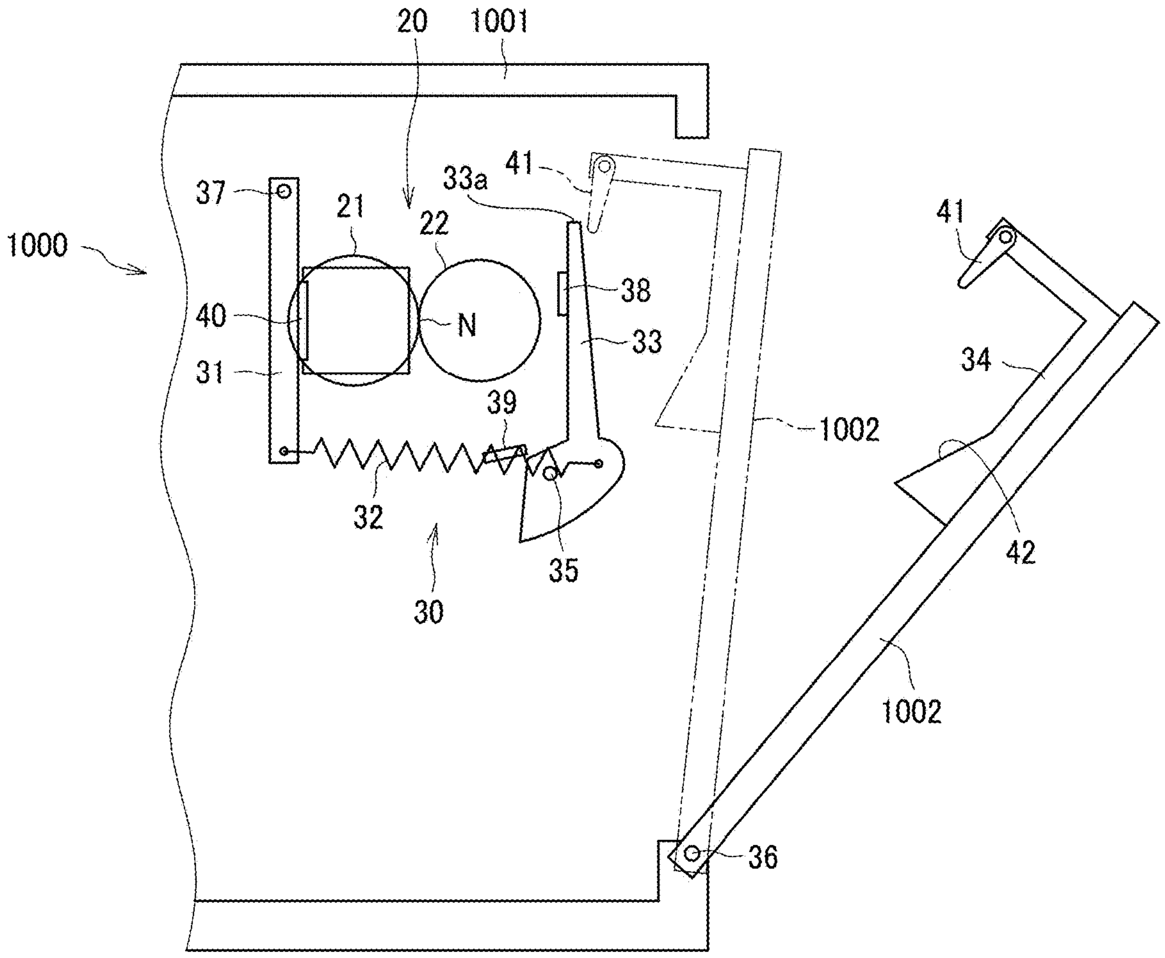
FIG. 9 is a partial cross-sectional view of the image forming apparatus depicted in FIG. 1, illustrating a switch of the pressure switching device, that moves from a pressure decrease position to a pressing position before a cover of the image forming apparatus closes.

However, the switch 33 is configured to pivot even if the operator does not pivot the cover 1002. Hence, as illustrated in FIG. 9, before the operator closes the cover 1002, the switch 33 may move from a pressure decrease position where the switch 33 switches to the pressure decrease state to a pressing position where the switch 33 switches to the pressing state. In this case, when the operator closes the cover 1002, as illustrated with an alternate long and two short dashes line in FIG. 9, the hook 41 of the operation member 34 may interfere with the tip 33*a* of the switch 33 situated at the pressing position, resulting in damaging to the hook 41 or the switch 33.

Figure 10:
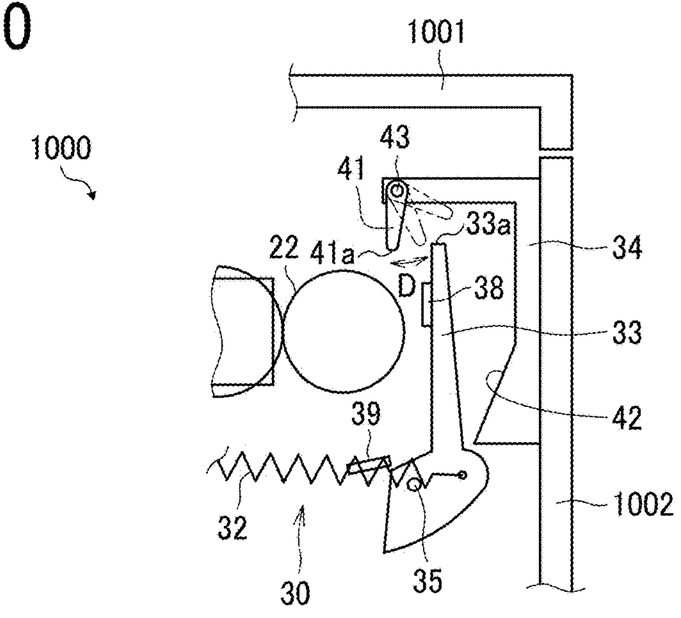
FIG. 10 is a partial cross-sectional view of the image forming apparatus depicted in FIG. 1, illustrating a hook incorporated in the pressure switching device, that does not interfere with the switch.

To address the circumstance, according to the first embodiment of the present disclosure, in order to prevent the hook 41 or the switch 33 from being damaged, as illustrated in FIG. 10, the operation member 34 mounts a fulcrum 43 that contacts a base end of the hook 41. The hook 41 pivots about the fulcrum 43 in a pivot direction D. Hence, even if the operator closes the cover 1002 after the switch 33 moves to the pressing position, when the hook 41 comes into contact with the switch 33, the hook 41 pivots about the fulcrum 43. Accordingly, a tip 41*a* of the hook 41 passes beyond the switch 33 smoothly. Thus, the hook 41 does not interfere with the switch 33, preventing the hook 41 or the switch 33 from being damaged due to interference of the hook 41 with the switch 33. In order to cause the hook 41 to contact the tip 33*a* of the switch 33 and to pivot the switch 33 when the operator opens the cover 1002, the hook 41 does not swing leftward clockwise in FIG. 10 from a vertical position illustrated with a solid line at which the hook 41 extends vertically.

As illustrated in FIG. 10, the tip 41*a* of the hook 41 and the tip 33*a* of the switch 33 are preferably slim to prevent interference. Since the tip 41*a* of the hook 41 and the tip 33*a* of the switch 33 are slim, also in the pressing state depicted in FIG. 5 in which the cover 1002 is closed, the hook 41 prevents interference with the switch 33 readily.

A description is provided of a construction of a pressure switching device 900 as a comparative example that is different from the pressure switching device 30 according to the first embodiment of the present disclosure.

Figure 40:
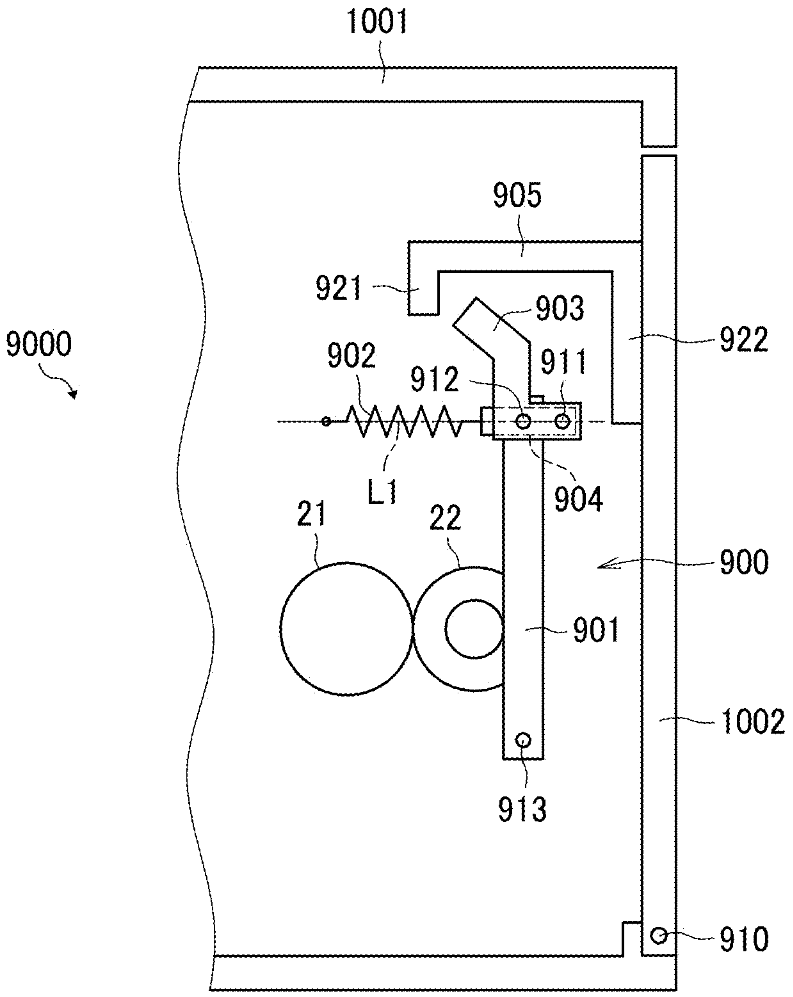
FIG. 40 is a partial cross-sectional view of an image forming apparatus incorporating a pressure switching device as a comparative example of the pressure switching device depicted in FIG. 5.

FIG. 40 is a cross-sectional view of an image forming apparatus 9000 including the pressure switching device 900 as the comparative example, illustrating the construction of the pressure switching device 900.

The pressure switching device 900 as the comparative example includes a presser 901, a pressure spring 902, a switch 903, and a switch holder 904 that are disposed inside the apparatus body 1001. The switch holder 904 generates a pivot moment that retains the pressing state or the pressure decrease state that is switched by the switch 903. The pressure switching device 900 further includes a coupler 911 that couples the switch holder 904 with the switch 903. The switch holder 904 pivots about the coupler 911. The pressure spring 902 has one end that is anchored to the switch holder 904.

The pressure switching device 900 further includes an operation member 905 that is mounted on the cover 1002 that is opened and closed. The operation member 905 pivots the switch 903. The operation member 905 includes a hook 921 and a scoop 922 that serve as operation portions, respectively. The image forming apparatus 9000 further includes a fulcrum 910 about which the cover 1002 pivots. The pressure switching device 900 further includes a fulcrum 912 about which the switch 903 pivots and a fulcrum 913 about which the presser 901 pivots. The switch 903 is coupled with the presser 901 such that the switch 903 and the presser 901 pivot about the fulcrum 912 of the switch 903 relatively.

Figure 41:
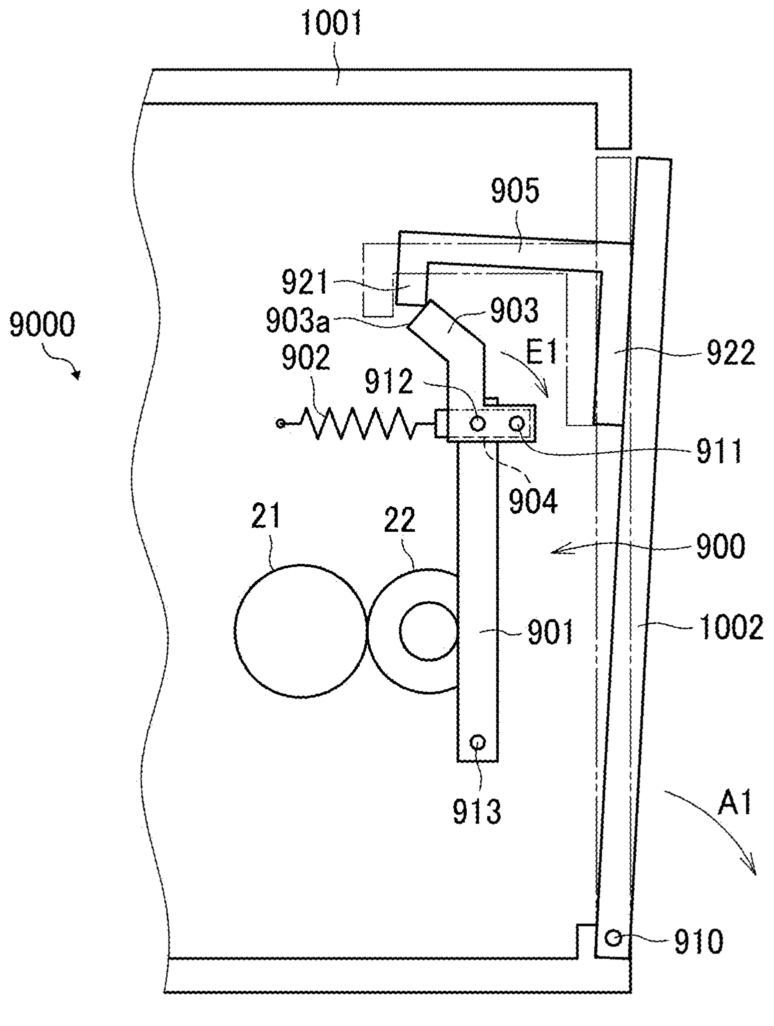
FIG. 41 is a partial cross-sectional view of the image forming apparatus depicted in FIG. 40, illustrating the pressure switching device that performs a first process of switching.
Figure 42:
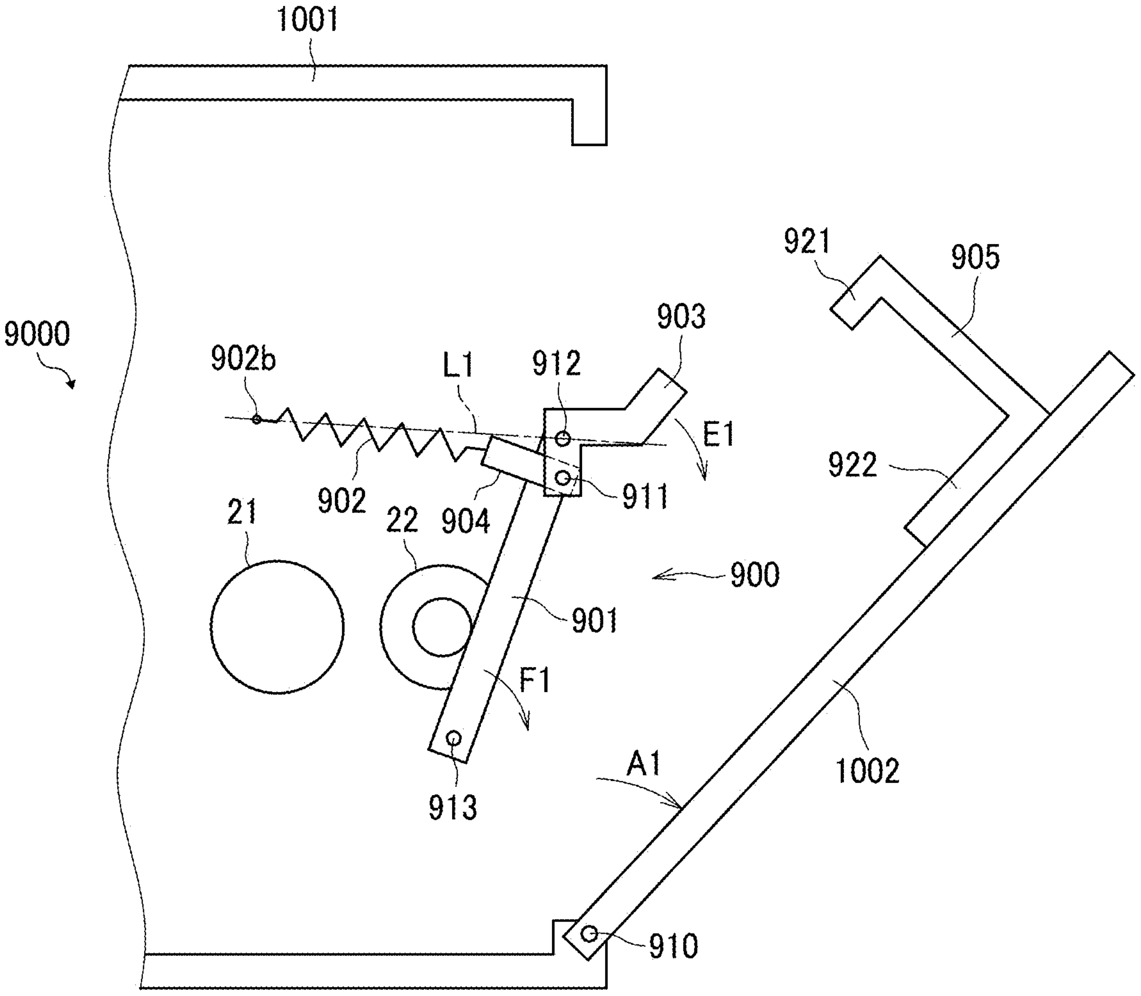
FIG. 42 is a partial cross-sectional view of the image forming apparatus depicted in FIG. 40, illustrating the pressure switching device that performs a second process of switching.

With the construction of the pressure switching device 900 as the comparative example, as illustrated in FIG. 41, as the operator pivots and opens the cover 1002 in the pivot direction A1, the hook 921 of the operation member 905 comes into contact with a top end 903*a* of the switch 903. Accordingly, the switch 903 pivots about the fulcrum 912 in a pivot direction E1. As illustrated in FIG. 42, as the switch 903 pivots in the pivot direction E1, the presser 901 pivots about the fulcrum 913 in a pivot direction F1. Thus, the switch 903 switches from the pressing state to the pressure decrease state of the fixing belt 21 and the pressure roller 22.

As the switch 903 pivots in the pivot direction E1, the coupler 911 that couples the switch 903 with the switch holder 904 moves downward beyond a line L1 to an opposite side defined by the line L1, that is, a lower side below the line L1 in FIG. 42. The line L1 passes through the fulcrum 912 of the switch 903 and one end 902*b* of the pressure spring 902, that is anchored to the apparatus body 1001. Accordingly, the switch 903 is exerted with a pivot moment that pivots the switch 903 in the pivot direction E1. Consequently, the pressure switching device 900 retains the switch 903 and the presser 901 at positions illustrated in FIG. 42, respectively. Thus, the pressure switching device 900 retains the pressure decrease state in which the presser 901 releases pressure applied to the fixing belt 21 by the pressure roller 22.

Figure 43:
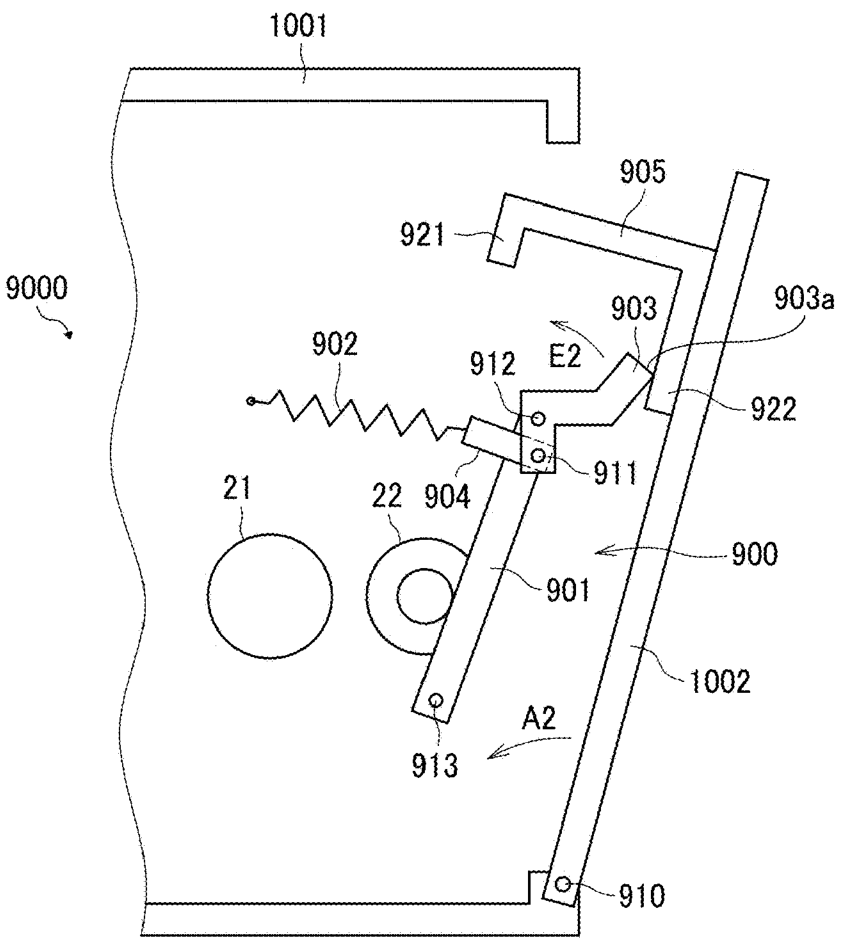
FIG. 43 is a partial cross-sectional view of the image forming apparatus depicted in FIG. 40, illustrating the pressure switching device that performs a third process of switching.

As illustrated in FIG. 43, as the operator pivots and closes the cover 1002 in the pivot direction A2, the scoop 922 of the operation member 905 presses the top end 903*a* of the switch 903. Accordingly, the switch 903 pivots about the fulcrum 912 in a pivot direction E2. As the switch 903 pivots in the pivot direction E2, the presser 901 pivots counterclockwise in FIG. 43 in a pressing direction in which the presser 901 presses the pressure roller 22 against the fixing belt 21. Thus, the switch 903 switches from the pressure decrease state to the pressing state of the fixing belt 21 and the pressure roller 22 depicted in FIG. 40.

As the switch 903 pivots in the pivot direction E2, the coupler 911 that couples the switch 903 with the switch holder 904 is situated on the line L1 as illustrated in FIG. 40. Accordingly, the switch 903 is not exerted with the pivot moment that pivots the switch 903 in the pivot direction E1. Consequently, the pressure switching device 900 retains the switch 903 and the presser 901 at positions illustrated in FIG. 40, respectively. Thus, the pressure switching device 900 retains the pressing state in which the pressure roller 22 is pressed against the fixing belt 21.

As described above, the pressure switching device 900 as the comparative example incorporates the switch holder 904 that adjusts the pivot moment applied to the switch 903, retaining the pressing state or the pressure decrease state that is switched by the switch 903. Conversely, with the construction of the pressure switching device 30 according to the first embodiment of the present disclosure, even if the pressure switching device 30 does not incorporate the switch holder 904, the pressure switching device 30 adjusts the pivot moment applied to the switch 33, retaining the pressing state or the pressure decrease state that is switched by the switch 33. Accordingly, compared to the pressure switching device 900 as the comparative example, the pressure switching device 30 according to the first embodiment of the present disclosure decreases the number of parts, simplifying the construction of the pressure switching device 30. Since the pressure switching device 30 decreases the number of parts, the pressure switching device 30 reduces variation such as assembly errors of parts, attaining stable operation.

A description is provided of a construction of a pressure switching device (e.g., a pressure switching mechanism) as another comparative example that pivots a pressure lever interlocked with an apparatus cover.

As the apparatus cover closes, the pressure lever interlocked with the apparatus cover pivots. Thus, the pressure lever presses a pressure roller against a fixing roller in a pressing state. When a pressing lever mounted on the apparatus cover strikes a pivot lever that pivots the pressure lever, the pressing lever generates a noise. In order to reduce the noise, a vibration isolating member is disposed at a striking position where the pressing lever strikes the pivot lever.

However, when the pivot lever strikes the vibration isolating member, the pivot lever may engage the vibration isolating member.

A description is provided of problems to be solved by the pressure switching device 30 according to the first embodiment of the present disclosure.

Before the operator closes the cover 1002, the tip 33*a* of the switch 33 of the pressure switching device 30 according to the first embodiment of the present disclosure is situated at a position relative to the fulcrum 35, that is different from a position of the top end 903*a* of the switch 903 relative to the fulcrum 912 of the pressure switching device 900 as the comparative example. For example, compared to the top end 903*a* of the switch 903 of the pressure switching device 900 as the comparative example depicted in FIG. 43, the tip 33*a* of the switch 33 of the pressure switching device 30 according to the first embodiment of the present disclosure is situated at a position relative to the fulcrum 35 serving as a center of rotation of the switch 33 depicted in FIG. 8, that is close to a horizontal line with a decreased difference in elevation. Hence, according to the first embodiment of the present disclosure, as the operator closes the cover 1002, the switch 33 is not exerted with the pivot moment that pivots the switch 33 in the pivot direction C2 easily. To address the circumstance, in order to lift the tip 33*a* of the switch 33 and pivot the switch 33 in the pivot direction C2, as illustrated in FIG. 8, the scoop 42 is to have a slope that is inclined with respect to an inner face of the cover 1002, that is, a mount face 1002*a* mounting the operation member 34.

However, if the scoop 42 has the slope, in a case that the scoop 42 mounts a slide mechanism that slides the vibration isolating member of the pressure switching device as another comparative example, as the operator opens and closes the cover 1002, the slide mechanism may not operate properly. For example, if the scoop 42 has the slope, when the operator closes the cover 1002, the scoop 42 may not extend vertically. Accordingly, the vibration isolating member may not slide and move downward by gravity smoothly. Consequently, in a case that the vibration isolating member does not move to a target position, the tip 33*a* of the switch 33 may not contact the vibration isolating member, generating noise.

As described above, in a case that the scoop 42 has the slope, the vibration isolating member may not slide and move smoothly. Accordingly, the slide mechanism may not prevent degradation in operation, that is caused by engagement of the switch 33 with the vibration isolating member. Additionally, like the first embodiment of the present disclosure, in order to prevent the hook 41 from interfering with the switch 33 readily or in order to obtain the pivot moment readily as the scoop 42 presses the switch 33, the tip 33*a* of the switch 33 may be thinned. However, the tip 33*a* of the switch 33 may engage the vibration isolating member more easily, degrading operation of the pressure switching device 30 notably.

To address the circumstance, according to the first embodiment of the present disclosure, in order to prevent degradation in operation, that is caused by engagement of the switch 33 with the vibration isolating member, the pressure switching device 30 has an advantageous construction described below.

The following describes the advantageous construction of the pressure switching device 30 according to the first embodiment of the present disclosure.

Figure 11:
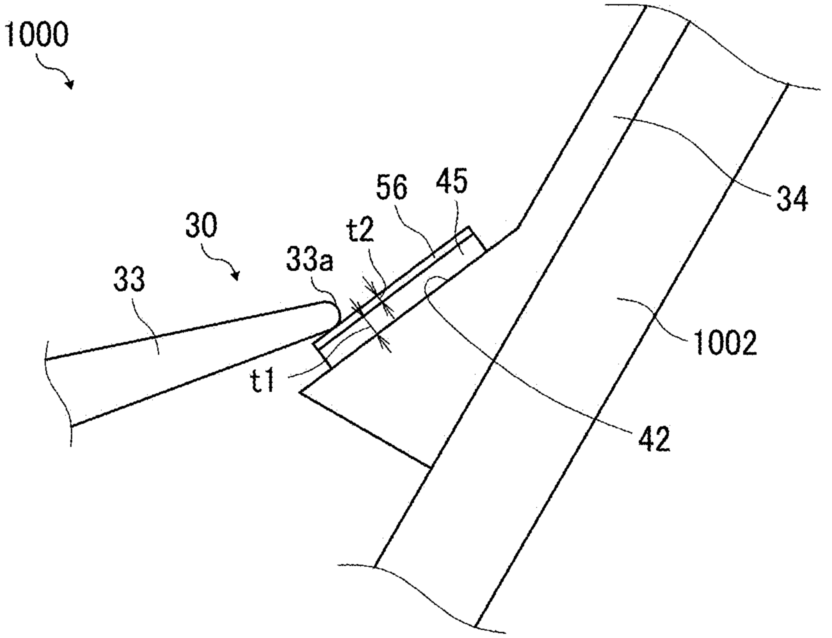
FIG. 11 is a partially enlarged cross-sectional view of the image forming apparatus depicted in FIG. 1, illustrating a scoop incorporated in the pressure switching device.

FIG. 11 is a partially enlarged view of the pressure switching device 30 according to the first embodiment of the present disclosure, illustrating the scoop 42.

As illustrated in FIG. 11, the pressure switching device 30 according to the first embodiment of the present disclosure includes a vibration isolating member 45 and a slide aid 56. The vibration isolating member 45 is mounted on the scoop 42. The slide aid 56 is mounted on a surface of the vibration isolating member 45.

The vibration isolating member 45 reduces noise that generates when the scoop 42 of the operation member 34 strikes or presses against the switch 33. The noise is hereinafter referred to as collision noise. Hence, the vibration isolating member 45 is disposed at a contact position on the scoop 42 of the operation member 34 where the switch 33 comes into contact with the scoop 42 of the operation member 34 when the operator closes the cover 1002. The contact position does not denote a portion of the scoop 42 where the switch 33 contacts the scoop 42 of the operation member 34 directly. The contact position denotes a portion of the scoop 42 where the switch 33 presses against the scoop 42 of the operation member 34 indirectly via the slide aid 56 and the vibration isolating member 45. In addition to the position where the switch 33 presses against the scoop 42 of the operation member 34, the contact position also encompasses a slide region where the switch 33 slides over the scoop 42 of the operation member 34 as the operator closes the cover 1002 after the switch 33 comes into contact with the slide aid 56 mounted on the vibration isolating member 45 mounted on the scoop 42. For example, the vibration isolating member 45 is made of a porous elastic body including foam rubber such as urethane foam.

The slide aid 56 facilitates sliding of the switch 33 more than the vibration isolating member 45. The slide aid 56 has a hardness that is greater than a hardness of the vibration isolating member 45. For example, the slide aid 56 is made of a material containing polyethylene terephthalate (PET). The slide aid 56 is mounted on a contact face (e.g., an opposed face) of the vibration isolating member 45, that is disposed opposite the switch 33, when the operator closes the cover 1002. The contact face does not denote a face of the vibration isolating member 45 where the switch 33 contacts the vibration isolating member 45 directly. The contact face denotes a face of the vibration isolating member 45 where the switch 33 presses against the vibration isolating member 45 indirectly via the slide aid 56. In addition to the position where the switch 33 presses against the vibration isolating member 45, the contact face also encompasses a slide region where the switch 33 slides over the vibration isolating member 45 as the operator closes the cover 1002 after the switch 33 comes into contact with the slide aid 56 mounted on the vibration isolating member 45.

As described above, according to the first embodiment of the present disclosure, the vibration isolating member 45 is mounted on the scoop 42 at the contact position where the switch 33 is disposed opposite the scoop 42. The slide aid 56 is mounted on the vibration isolating member 45 on the contact face thereof where the switch 33 is disposed opposite the vibration isolating member 45. Accordingly, the pressure switching device 30 improves motion of the switch 33 and reduces the collision noise. For example, according to the first embodiment of the present disclosure, as the operator closes the cover 1002, as illustrated in FIG. 11, the tip 33*a* of the switch 33 comes into contact with the slide aid 56 directly. However, since the vibration isolating member 45 is deformed elastically, the vibration isolating member 45 absorbs impact generated by contact of the switch 33 with the slide aid 56. Accordingly, the vibration isolating member 45 reduces collision noise generated by contact of the switch 33 with the slide aid 56. The slide aid 56 facilitates sliding of the switch 33 more than the vibration isolating member 45. The slide aid 56 has the hardness that is greater than the hardness of the vibration isolating member 45. Hence, when the switch 33 presses against the vibration isolating member 45 via the slide aid 56, the slide aid 56 suppresses engagement of the switch 33 with the vibration isolating member 45. Additionally, the slide aid 56 ensures sliding of the switch 33 over the vibration isolating member 45. Accordingly, as the operator closes the cover 1002, the slide aid 56 of the pressure switching device 30 interlocked with the cover 1002 facilitates smooth motion of the switch 33. Thus, the slide aid 56 reduces the collision noise that generates when the switch 33 strikes or presses against the scoop 42.

As a thickness of the slide aid 56 increases, stability in motion of the switch 33 increases when the switch 33 contacts the slide aid 56. Conversely, as the thickness of the slide aid 56 increases, absorption of the impact by the vibration isolating member 45 decreases. Accordingly, the collision noise may increase. To address the circumstance, the slide aid 56 is preferably thinner than the vibration isolating member 45. For example, the vibration isolating member 45 preferably has a thickness t1 that is not smaller than 1.0 mm and not greater than 3.0 mm. The slide aid 56 preferably has a thickness t2 that is not smaller than 0.1 mm and not greater than 0.3 mm. More preferably, the vibration isolating member 45 has a thickness t1 that is not smaller than 1.8 mm and not greater than 2.2 mm. The slide aid 56 has a thickness t2 that is not smaller than 0.18 mm and not greater than 0.2 mm. Thus, the thickness t1 of the vibration isolating member 45 and the thickness t2 of the slide aid 56 are adjusted and balanced. Accordingly, the pressure switching device 30 improves motion of the switch 33 and reduces the collision noise.

Figure 12:
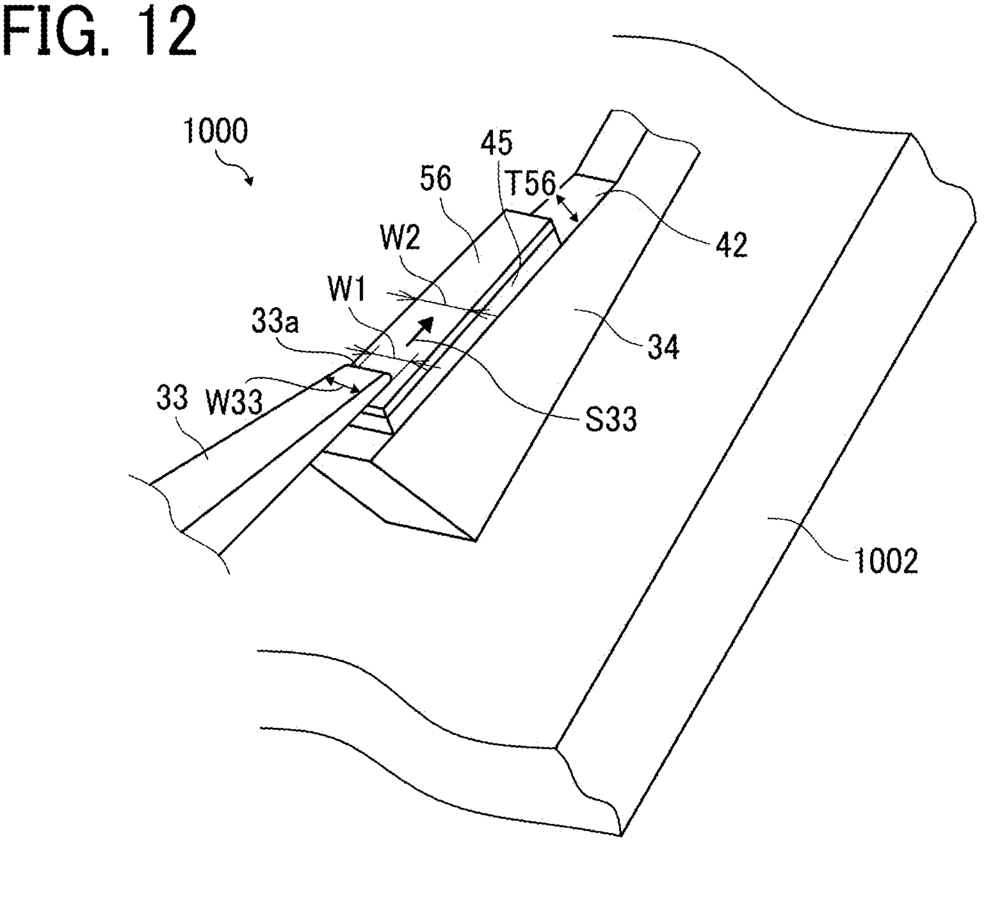
FIG. 12 is a partial perspective view of the image forming apparatus depicted in FIG. 1, illustrating a contact width of the switch that contacts a slide aid incorporated in the pressure switching device.

As illustrated in FIG. 12, the tip 33*a* of the switch 33 contacts the slide aid 56 with a contact width W1 of the slide aid 56. The contact width W1 is preferably not smaller than a half of a width W2 of the slide aid 56. Each of the contact width W1 and the width W2 of the slide aid 56 denotes a width in a width direction W33 that is perpendicular to a slide direction S33 in which the switch 33 slides over a slide face of the slide aid 56 and is perpendicular to a thickness direction T56 of the thickness t2 of the slide aid 56. As described above, since the contact width W1 is increased, the switch 33 contacts and presses against the slide aid 56 with decreased pressure, suppressing engagement of the switch 33 with the vibration isolating member 45 more effectively.

As described above, according to the first embodiment of the present disclosure, even if the scoop 42 has the slope that may degrade sliding of the switch 33 over the vibration isolating member 45, the slide aid 56 is mounted on the surface of the vibration isolating member 45. The slide aid 56 suppresses engagement of the switch 33 with the vibration isolating member 45, ensuring proper motion of the switch 33.

A description is provided of a construction of each of fixing devices and image forming apparatuses according to other embodiments of the present disclosure.

In addition to the fixing device 20 depicted in FIG. 2, the pressure switching device 30 according to the embodiments of the present disclosure is also applied to fixing devices 20A, 20B, 20C, 20D, and 20E described below with reference to FIGS. 13 to 23, respectively.

The following describes the construction of each of the fixing devices 20A, 20B, 20C, 20D, and 20E according to the embodiments of the present disclosure.

The reference numerals of the elements according to the first embodiment of the present disclosure, that appear in FIG. 2, are also assigned to elements of the embodiments described below, that are common to the elements depicted in FIG. 2 and a description of the elements is omitted.

Figure 13:
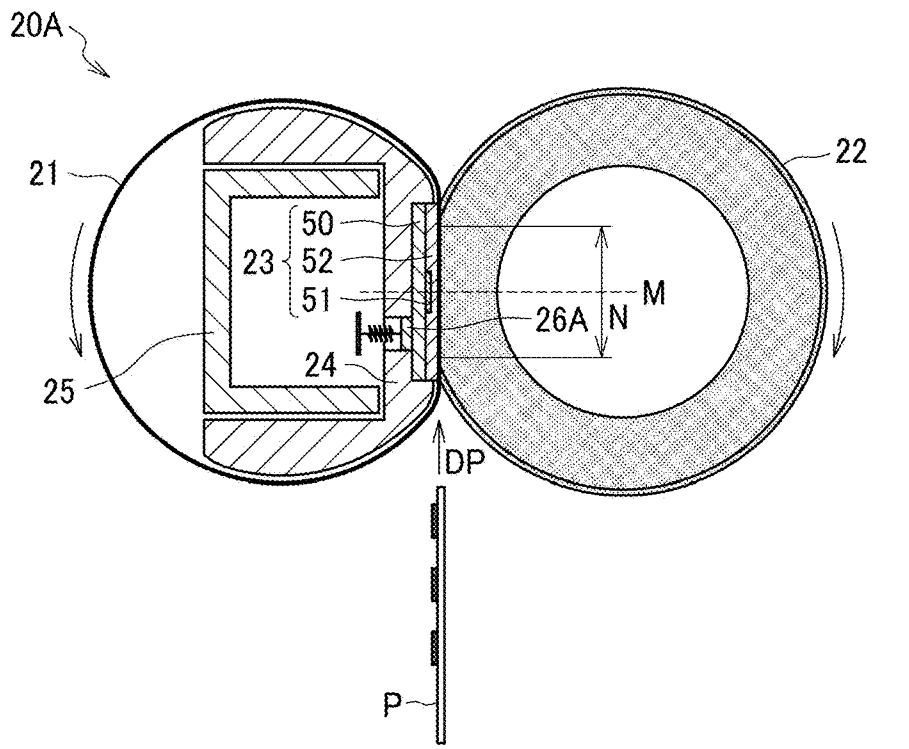
FIG. 13 is a schematic cross-sectional view of a fixing device according to another embodiment of the present disclosure to which the pressure switching device depicted in FIG. 5 is applied.

FIG. 13 illustrates the construction of the fixing device 20A including a temperature sensor 26A that detects the temperature of the heater 23. The temperature sensor 26A is disposed at a position different from a position of the temperature sensor 26 of the fixing device 20 depicted in FIG. 2. For example, the temperature sensor 26 of the fixing device 20 depicted in FIG. 2 is disposed opposite a center M of the fixing nip N in the sheet conveyance direction DP. Conversely, the temperature sensor 26A of the fixing device 20A depicted in FIG. 13 is disposed upstream from the center M of the fixing nip N in the sheet conveyance direction DP and disposed in proximity to an entry to the fixing nip N. A sheet P entering the entry to the fixing nip N draws heat from the fixing belt 21 easily. Since the temperature sensor 26A is disposed upstream from the center M of the fixing nip N in the sheet conveyance direction DP, the temperature sensor 26A detects the temperature of the heater 23 precisely at a position in proximity to the entry to the fixing nip N, effectively suppressing a fixing offset of heating a toner image on the sheet P insufficiently. The fixing device 20A incorporating the temperature sensor 26A disposed in proximity to the entry to the fixing nip N is also applied with the pressure switching device 30 according to the first embodiment of the present disclosure as a pressure switching mechanism that switches between the pressing state and the pressure decrease state of the fixing belt 21 and the pressure roller 22.

Figure 14:
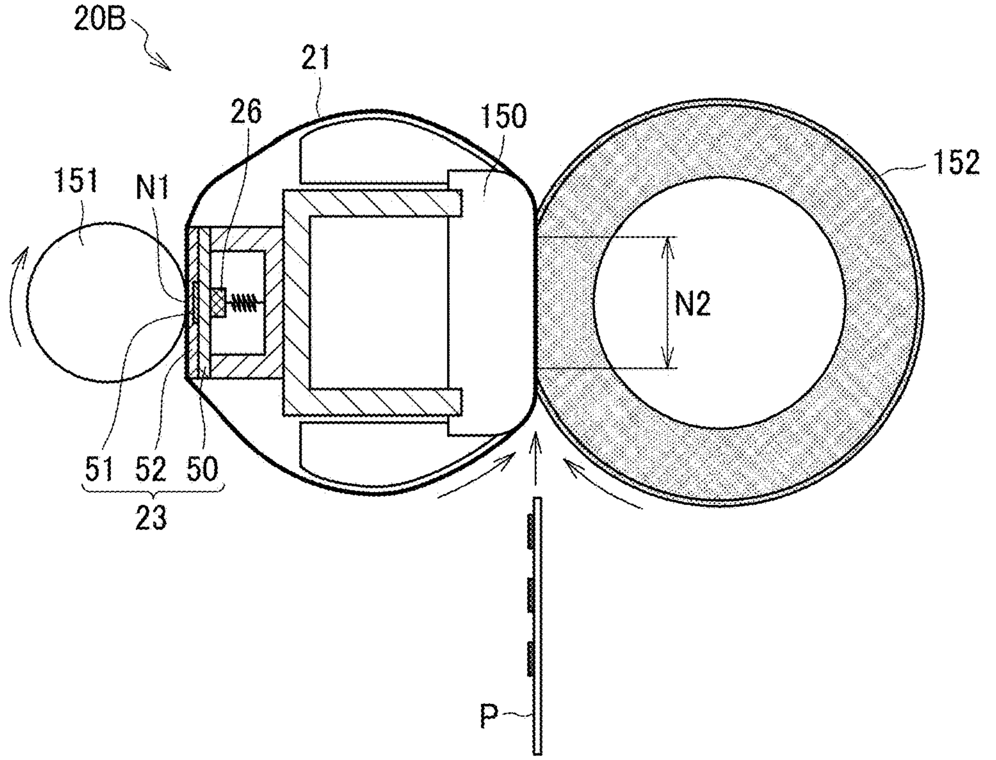
FIG. 14 is a schematic cross-sectional view of a fixing device according to yet another embodiment of the present disclosure to which the pressure switching device depicted in FIG. 5 is applied.

FIG. 14 illustrates the construction of the fixing device 20B that has a heating nip N1 and a fixing nip N2 disposed separately from the heating nip N1. The fixing device 20B includes two rollers, that is, a pressure roller 151 and a pressure roller 152 that is greater than the pressure roller 151. The pressure roller 151 contacts the fixing belt 21 to form the heating nip N1 therebetween. The pressure roller 152 contacts the fixing belt 21 to form the fixing nip N2 therebetween and is disposed opposite the pressure roller 151 via the fixing belt 21. For example, the pressure roller 151 disposed on the left of the fixing belt 21 in FIG. 14 presses against the heater 23 via the fixing belt 21, forming the heating nip N1 between the pressure roller 151 and the fixing belt 21. The fixing device 20B further includes a nip formation pad 150. The pressure roller 152 disposed on the right of the fixing belt 21 in FIG. 14 presses against the nip formation pad 150 via the fixing belt 21, forming the fixing nip N2 between the pressure roller 152 and the fixing belt 21. In the fixing device 20B having the heating nip N1 that is provided separately from the fixing nip N2, as the heater 23 generates heat, the heater 23 heats the fixing belt 21 at the heating nip N1. While a sheet P passes through the fixing nip N2, the fixing belt 21 and the pressure roller 152 fix an unfixed toner image on the sheet P under heat and pressure. The fixing device 20B having the construction described above is also applied with the pressure switching device 30 according to the first embodiment of the present disclosure as a pressure switching mechanism that switches between the pressing state and the pressure decrease state of the fixing belt 21 and the pressure roller 152 that form the fixing nip N2.

Figure 15:
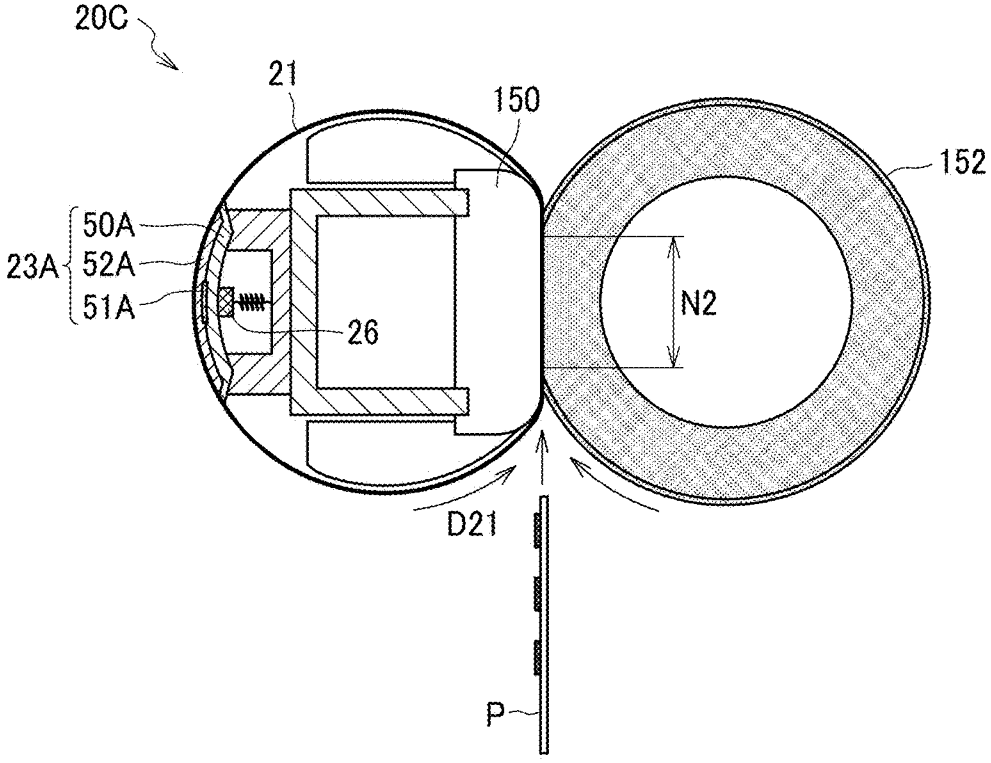
FIG. 15 is a schematic cross-sectional view of a fixing device according to yet another embodiment of the present disclosure to which the pressure switching device depicted in FIG. 5 is applied.

FIG. 15 illustrates the construction of the fixing device 20C that does not incorporate the pressure roller 151 that is disposed on the left of the fixing belt 21 of the fixing device 20B depicted in FIG. 14. The fixing device 20C includes a heater 23A including a base 50A, resistive heat generators 51A, and an insulating layer 52A that are curved into an arc in cross section that corresponds to a curvature of the fixing belt 21. Other construction of the fixing device 20C is equivalent to the construction of the fixing device 20B depicted in FIG. 14. Since the heater 23A is curved into the arc in cross section, the heater 23A contacts the fixing belt 21 for an increased contact length in the rotation direction D21 of the fixing belt 21, heating the fixing belt 21 efficiently. The fixing device 20C having the construction described above is also applied with the pressure switching device 30 according to the first embodiment of the present disclosure as a pressure switching mechanism that switches between the pressing state and the pressure decrease state of the fixing belt 21 and the pressure roller 152.

Figure 16:
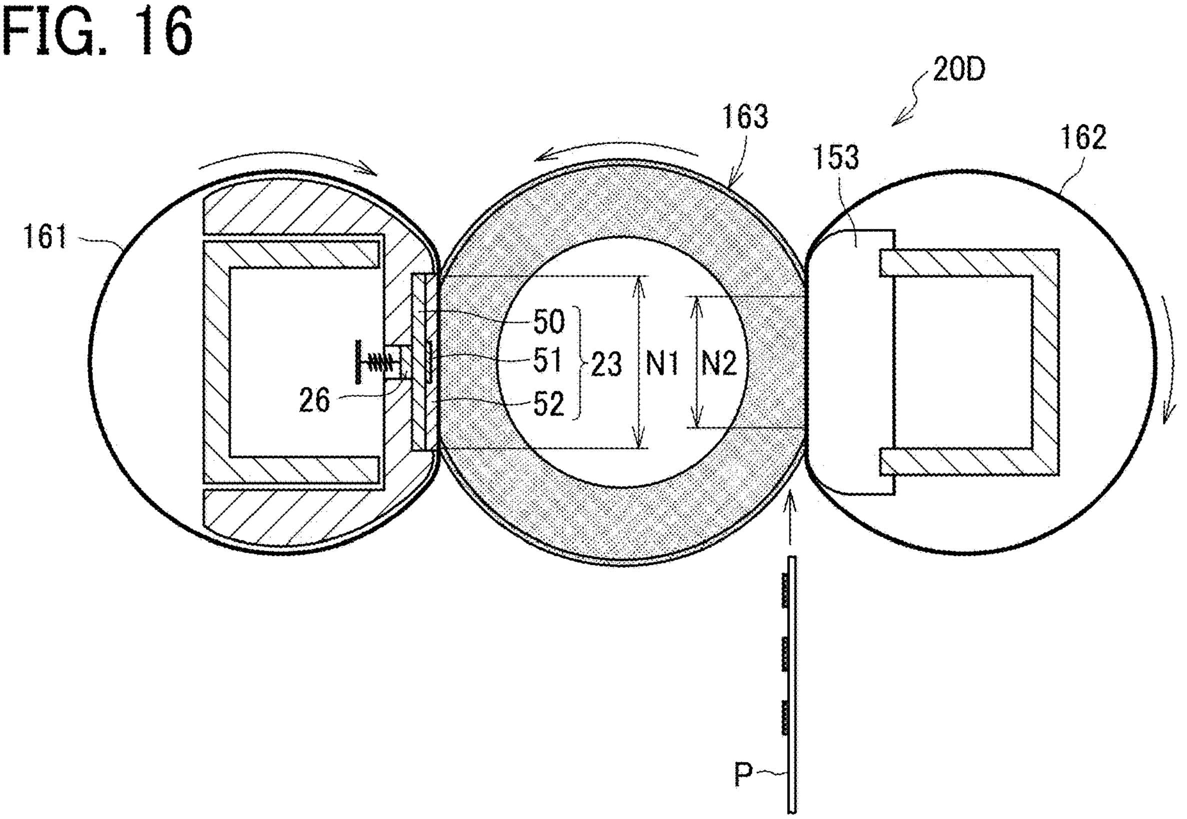
FIG. 16 is a schematic cross-sectional view of a fixing device according to yet another embodiment of the present disclosure to which the pressure switching device depicted in FIG. 5 is applied.

FIG. 16 illustrates the fixing device 20D that includes a center roller 163 and two belts 161 and 162 that sandwich the center roller 163. The belt 162 serves as a first rotator or a fixing rotator. The center roller 163 serves as a second rotator or a pressure rotator. The belt 161 on the left of the center roller 163 in FIG. 16 is sandwiched between the heater 23 disposed within a loop formed by the belt 161 and the center roller 163, thus forming the heating nip N1 between the belt 161 and the center roller 163. The fixing device 20D further includes a nip formation pad 153. The belt 162 on the right of the center roller 163 in FIG. 16 is sandwiched between the nip formation pad 153 disposed within a loop formed by the belt 162 and the center roller 163, thus forming the fixing nip N2 between the belt 162 and the center roller 163. The fixing device 20D having the construction described above is also applied with the pressure switching device 30 according to the first embodiment of the present disclosure as a pressure switching mechanism that switches between the pressing state and the pressure decrease state of the center roller 163 and the belt 162 on the right of the center roller 163, that form the fixing nip N2.

Application of the pressure switching device 30 according to the first embodiment of the present disclosure is not limited to the fixing devices 20, 20A, 20B, 20C, and 20D installed in the image forming apparatus 1000 depicted in FIG. 1 that forms a color toner image. The pressure switching device 30 is also applied to the fixing device 20E installed in an image forming apparatus 1000A illustrated in FIG. 17 that forms a monochrome toner image.

Figure 17:
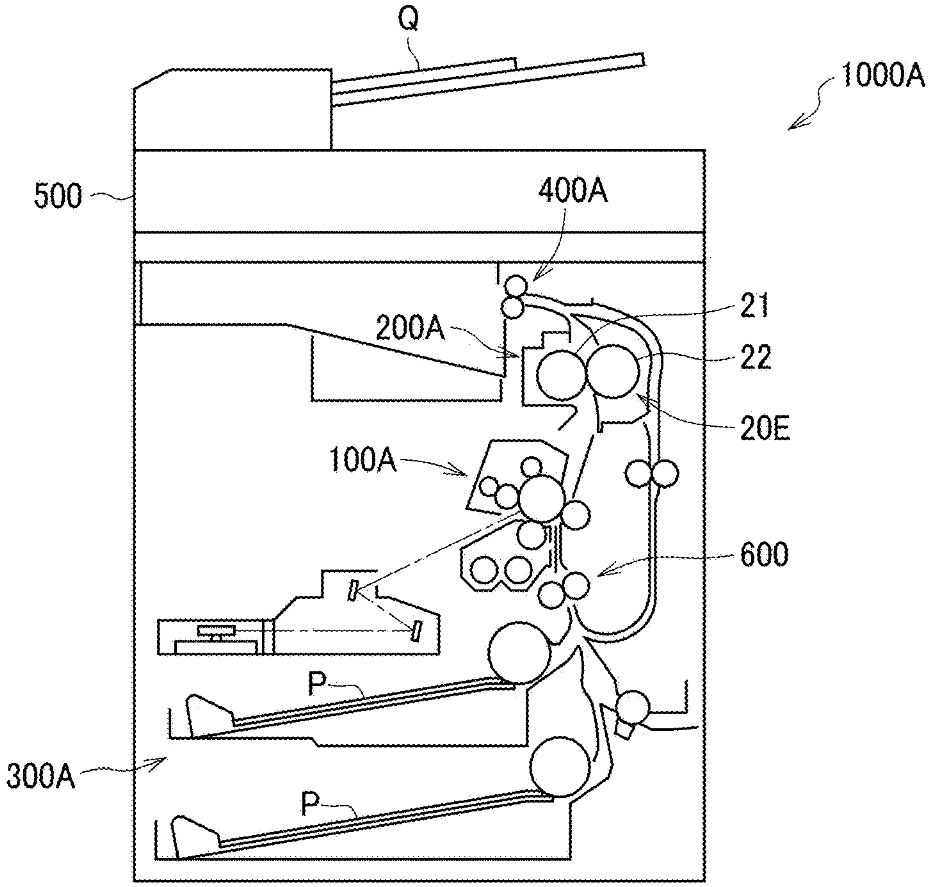
FIG. 17 is a schematic cross-sectional view of an image forming apparatus according to yet another embodiment of the present disclosure to which the pressure switching device depicted in FIG. 5 is applied.

FIG. 17 illustrates the image forming apparatus 1000A that includes an image forming portion 100A that includes a photoconductive drum, a sheet conveying portion 600 that includes a timing roller pair, a sheet supply portion 300A that supplies sheets P, a fixing portion 200A that includes the fixing device 20E, a sheet ejecting portion 400A that ejects the sheet P, and an image reading portion 500 that reads an image on an original Q. The sheet supply portion 300A includes a plurality of sheet trays (e.g., paper trays) that loads a plurality of sheets P having different sizes, respectively.

The image reading portion 500 reads the image on the original Q and creates image data based on the read image.

The image forming portion 100A forms a toner image according to the image data created by the image reading portion 500. For example, the image forming portion 100A includes the photoconductive drum, a charging roller, an exposure device, a developing device, a replenishing device, a transfer roller, a cleaner, and a discharger. The sheet conveying portion 600 conveys a sheet P supplied from the sheet supply portion 300A to the image forming portion 100A. The image forming portion 100A transfers the toner image onto the sheet P conveyed to the image forming portion 100A.

The fixing portion 200A heats and presses the sheet P transferred with the toner image, fixing the toner image on the sheet P. The image forming apparatus 1000A further includes a conveyance roller and the like that convey the sheet P fixed with the toner image to the sheet ejecting portion 400A. The sheet ejecting portion 400A ejects the sheet P onto an outside of the image forming apparatus 1000A.

Figure 18:
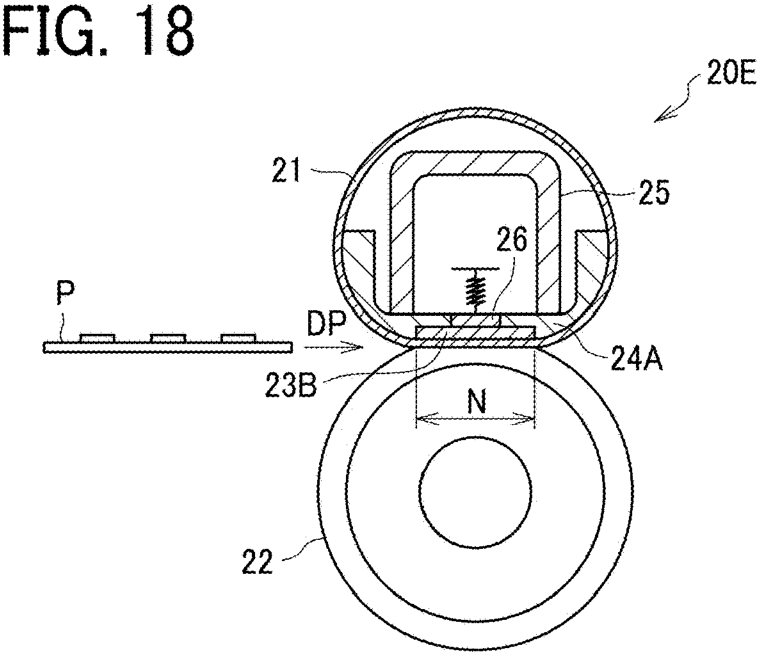
FIG. 18 is a cross-sectional view of a fixing device according to yet another embodiment of the present disclosure, that is incorporated in the image forming apparatus depicted in FIG. 17.

FIG. 18 is a schematic cross-sectional view of the fixing device 20E installed in the image forming apparatus 1000A depicted in FIG. 17.

As illustrated in FIG. 18, the fixing device 20E includes the fixing belt 21, the pressure roller 22, a heater 23B, a heater holder 24A, the stay 25, and the temperature sensor 26.

The fixing nip N is formed between the fixing belt 21 and the pressure roller 22. The fixing nip N has a nip width of 10 mm in the sheet conveyance direction DP. The fixing belt 21 and the pressure roller 22 convey the sheet P at a linear velocity of 240 mm/s.

The fixing belt 21 includes the base layer made of polyimide and the release layer and does not include the elastic layer. The release layer is heat-resistant film made of fluororesin, for example. The fixing belt 21 has an outer diameter of approximately 24 mm.

The pressure roller 22 includes the core metal, the elastic layer, and the release layer. The pressure roller 22 has an outer diameter in a range of from 24 mm to 30 mm. The elastic layer of the pressure roller 22 has a thickness in a range of from 3 mm to 4 mm.

Figure 19:
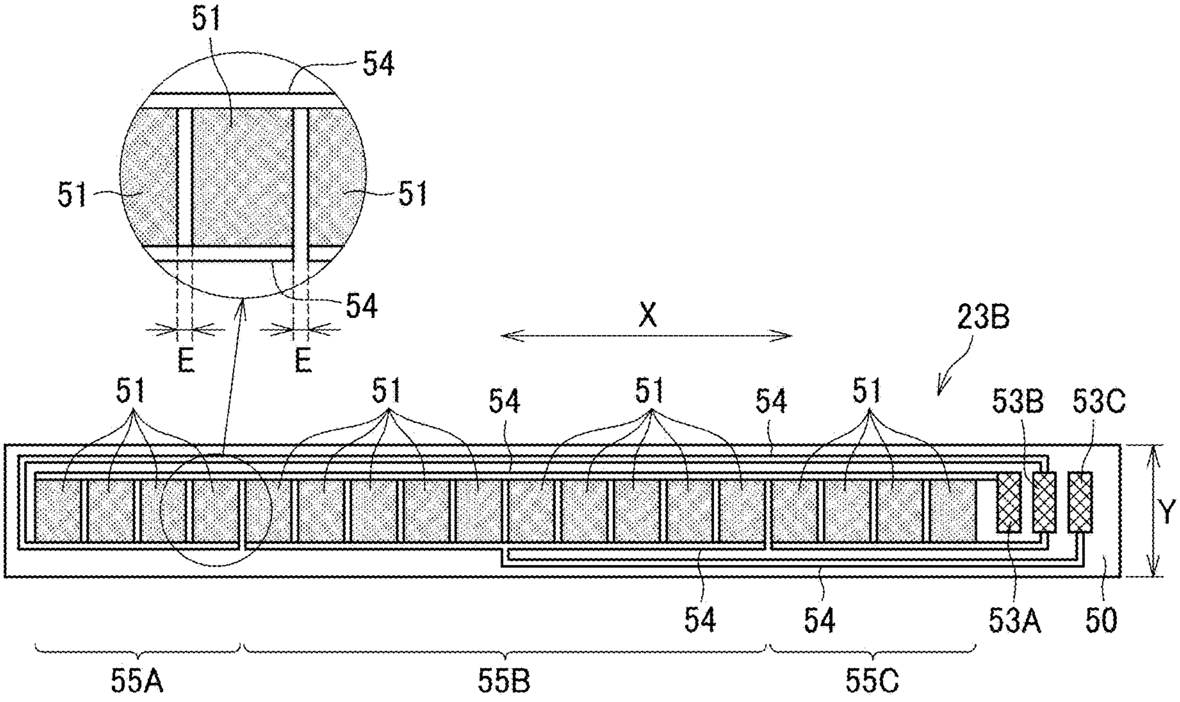
FIG. 19 is a plan view of a heater incorporated in the fixing device depicted in FIG. 18.

As illustrated in FIG. 19, the heater 23B includes the base 50, a thermal insulation layer, a conductor layer including the resistive heat generators 51, and an insulating layer. The heater 23B has a total thickness of 1 mm. The heater 23B has a width of 13 mm in the sheet conveyance direction DP (e.g., a short direction Y).

FIG. 19 is a plan view of the heater 23B incorporated in the fixing device 20E depicted in FIG. 18.

The heater 23B depicted in FIG. 19 includes the conductor layer constructed of the plurality of resistive heat generators 51, the feeders 54, and electrodes 53A, 53B, and 53C. The plurality of resistive heat generators 51 is arranged in the longitudinal direction X of the heater 23B with a gap E between the adjacent resistive heat generators 51. The gap E between the adjacent resistive heat generators 51 defines a dividing region. As illustrated in an enlarged view in FIG. 19, the resistive heat generators 51 create a plurality of gaps E each of which is provided between the adjacent resistive heat generators 51. FIG. 19 illustrates two gaps E in the enlarged view. However, the gap E is disposed at each gap between the adjacent resistive heat generators 51 depicted in FIG. 19. In FIG. 19, the short direction Y is an orthogonal direction intersecting or being perpendicular to the longitudinal direction X of the heater 23B. The short direction Y is different from a thickness direction of the base 50. The short direction Y is an orthogonal direction perpendicular to an arrangement direction of the plurality of resistive heat generators 51. The short direction Y is parallel to a mount face of the base 50, that mounts the resistive heat generators 51. The short direction Y is a short direction of the heater 23B. The short direction Y is parallel to the sheet conveyance direction DP depicted in FIG. 18 in which the sheet P is conveyed through the fixing device 20E.

The plurality of resistive heat generators 51 constructs a center heat generation portion 55B and lateral end heat generation portions 55A and 55C that generate heat separately from the center heat generation portion 55B. For example, the heater 23B includes the three electrodes 53A, 53B, and 53C. As power is supplied to the electrode 53A on the left of the electrode 53B and the electrode 53B disposed at a center of the three electrodes 53A, 53B, and 53C in FIG. 19, the lateral end heat generation portions 55A and 55C generate heat. As power is supplied to the electrodes 53A and 53C that sandwich the electrode 53B, the center heat generation portion 55B generates heat. For example, in order to fix a toner image on a sheet P having a decreased size not greater than a predetermined size, the center heat generation portion 55B generates heat. In order to fix a toner image on a sheet P having an increased size greater than the predetermined size, the lateral end heat generation portions 55A and 55C and the center heat generation portion 55B generate heat, heating the fixing belt 21 according to a size of a sheet P.

Figure 20:
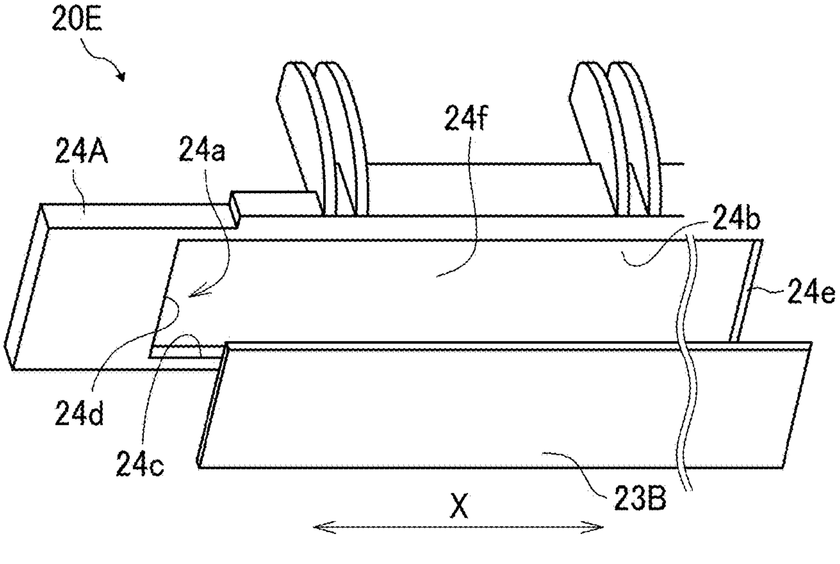
FIG. 20 is a perspective view of the heater depicted in FIG. 19 and a heater holder incorporated in the fixing device depicted in FIG. 18.

As illustrated in FIG. 20, the heater holder 24A includes a recess 24*a* that accommodates and holds the heater 23B depicted in FIG. 19. The recess 24*a* is disposed on a heater opposed face of the heater holder 24A, that is disposed opposite the heater 23B. The recess 24*a* is constructed of a bottom 24*f* (e.g., a bottom face) and four walls 24*b*, 24*c*, 24*d*, and 24*e* (e.g., side faces). The bottom 24*f* is a rectangle that is equivalent to the heater 23B in size. The four walls 24*b*, 24*c*, 24*d*, and 24*e* extend along four sides, respectively, that define a contour of the bottom 24*f* and are perpendicular to the bottom 24*f*. The pair of walls 24*d* and 24*e* (e.g., a left wall and a right wall in FIG. 20) extends in a direction perpendicular to the longitudinal direction X of the heater 23B, that is, the arrangement direction in which the resistive heat generators 51 are arranged. One of the walls 24*d* and 24*e* may be omitted so that the recess 24*a* is open at a position disposed opposite one lateral end of the heater 23B in the longitudinal direction X thereof.

Figure 21:
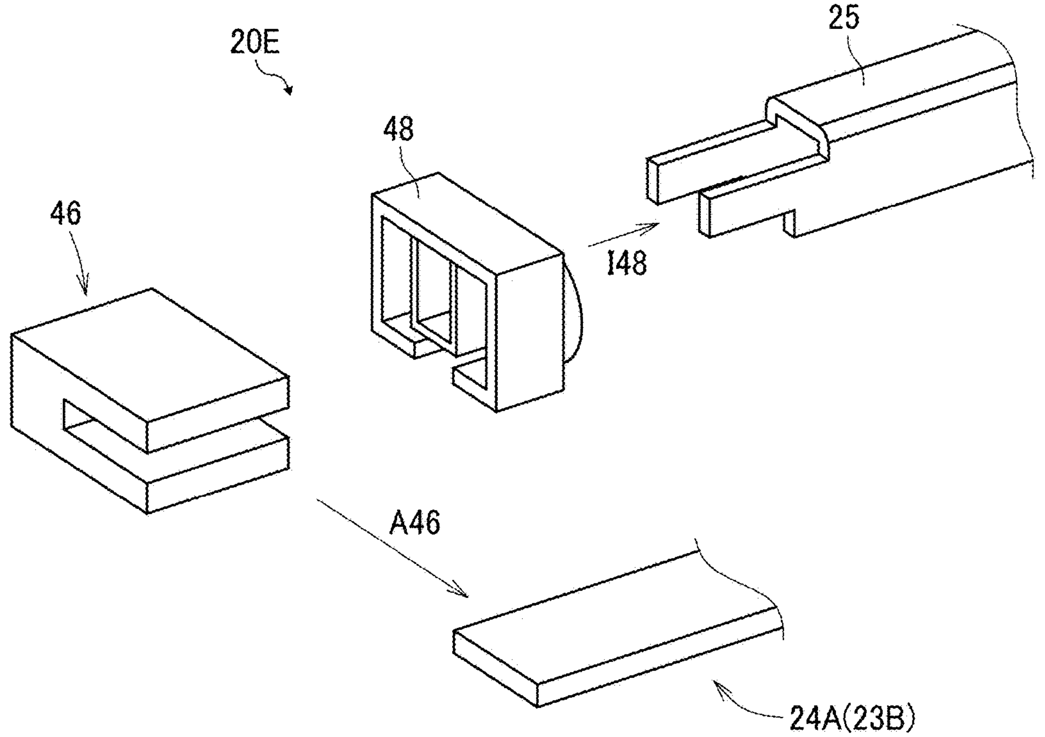
FIG. 21 is a perspective view of the heater incorporated in the fixing device depicted in FIG. 18 and a connector to be attached to the heater.

As illustrated in FIG. 21, the fixing device 20E further includes a connector 46 that supports the heater 23B and the heater holder 24A. The connector 46 includes a housing made of resin such as LCP and a plurality of contact terminals disposed in the housing.

The connector 46 is attached to the heater 23B and the heater holder 24A in an attachment direction A46 perpendicular to the longitudinal direction X of the heater 23B depicted in FIG. 20, that is, the arrangement direction in which the resistive heat generators 51 are arranged. In a state in which the connector 46 is attached to the heater 23B and the heater holder 24A, the connector 46 sandwiches and holds the heater 23B and the heater holder 24A such that the connector 46 is disposed opposite a front face and a back face of the heater 23B and the heater holder 24A. In a state in which the connector 46 holds the heater 23B and the heater holder 24A, as the contact terminals of the connector 46 contact and press against the electrodes 53A, 53B, and 53C of the heater 23B, the resistive heat generators 51 are electrically connected to a power supply disposed in the image forming apparatus 1000A through the connector 46. Thus, the power supply is ready to supply power to the resistive heat generators 51.

Figure 22:
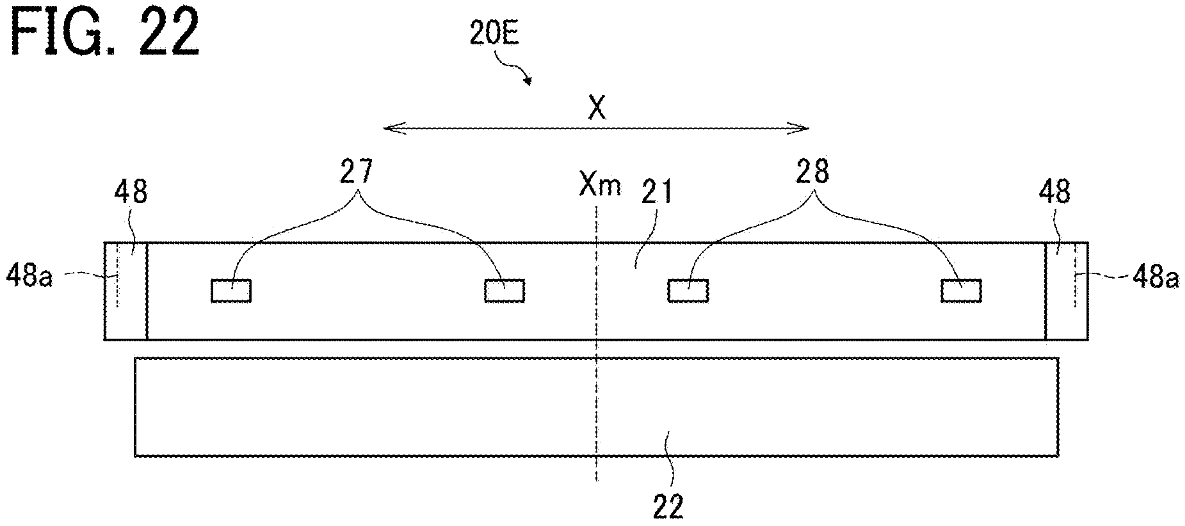
FIG. 22 is a diagram of the fixing device depicted in FIG. 18, illustrating flanges, thermistors, and thermostats incorporated therein.

The fixing device 20E further includes a flange 48 depicted in FIG. 21. As illustrated in FIG. 22, the flanges 48 are disposed at both lateral ends of the fixing belt 21 in the longitudinal direction X thereof, respectively. The flanges 48 serve as belt holders that contact the inner circumferential face of the fixing belt 21 and hold or support the fixing belt 21 at both lateral ends of the fixing belt 21 in the longitudinal direction X thereof, respectively. As illustrated in FIG. 21, the flange 48 is inserted into each lateral end of the stay 25 in an insertion direction 148 and is secured to each of a pair of side plates serving as a frame of the fixing device 20E.

FIG. 22 is a diagram of the fixing device 20E, illustrating an arrangement of the thermistors 27 and the thermostats 28, that is different from an arrangement of the thermistors 27 and the thermostat 28 depicted in FIG. 4.

As illustrated in FIG. 22, the thermistors 27 for temperature control are disposed opposite the inner circumferential face of the fixing belt 21 at a position in proximity to a center Xm and a position in one lateral end portion of the fixing belt 21 in the longitudinal direction X thereof, respectively. One of the thermistors 27 is disposed opposite the gap E depicted in FIG. 19 between the adjacent resistive heat generators 51 of the heater 23B.

The thermostats 28 for preventing overheating of the heater 23B are disposed opposite the inner circumferential face of the fixing belt 21 at a position in proximity to the center Xm and a position in another lateral end portion of the fixing belt 21 in the longitudinal direction X thereof, respectively. Each of the thermostats 28 detects a temperature of the inner circumferential face of the fixing belt 21 or an ambient temperature at a position in proximity to the inner circumferential face of the fixing belt 21. In a case that the temperature detected by the thermostat 28 is higher than a preset threshold, the thermostat 28 breaks power supply to the heater 23B.

Figure 23:
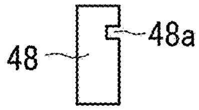
FIG. 23 is a diagram of the flange depicted in FIG. 22, illustrating a slide groove of the flange.

As illustrated in FIGS. 22 and 23, the flanges 48 that hold both lateral ends of the fixing belt 21 in the longitudinal direction X thereof include slide grooves 48*a*, respectively. The slide groove 48*a* extends in a contact-separation direction in which the fixing belt 21 comes into contact with and separates from the pressure roller 22. The slide grooves 48*a* engage engagements mounted on the frame of the fixing device 20E, respectively. As the engagement moves relatively inside the slide groove 48*a*, the fixing belt 21 moves in the contact-separation direction with respect to the pressure roller 22.

The pressure switching device 30 according to the embodiments of the present disclosure is also applied to fixing devices 20F, 20G, 20H, 20I, 20J, 20K, 20L, and 20M illustrated in FIGS. 24 to 35 that have constructions described below, respectively.

Figure 24:
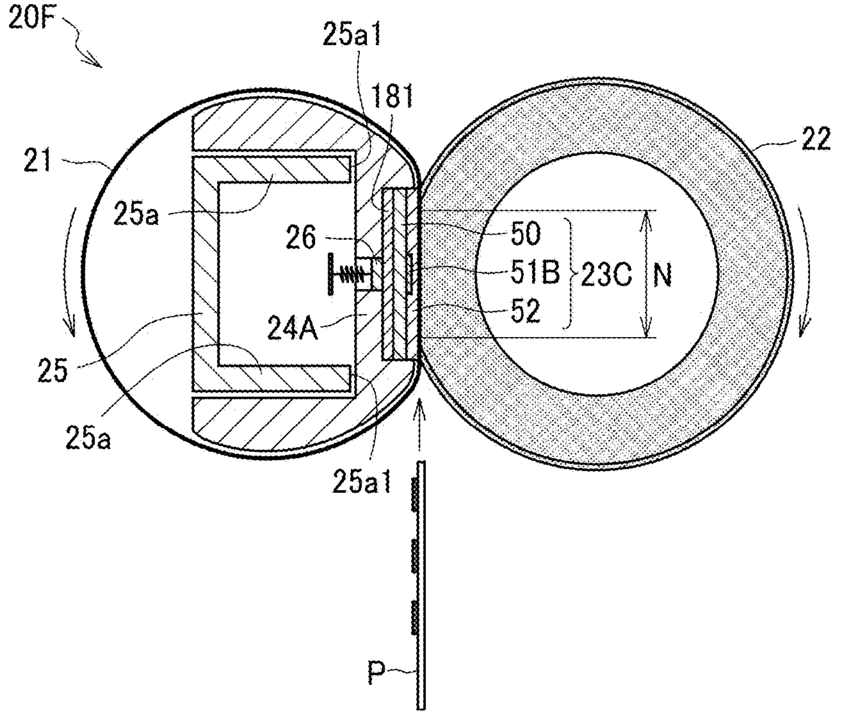
FIG. 24 is a schematic cross-sectional view of a fixing device according to yet another embodiment of the present disclosure to which the pressure switching device depicted in FIG. 5 is applied.

FIG. 24 is a schematic cross-sectional view of the fixing device 20F to which the pressure switching device 30 is applied.

As illustrated in FIG. 24, the fixing device 20F includes the fixing belt 21 serving as the first rotator or the fixing rotator, the pressure roller 22 serving as the second rotator or the pressure rotator, a heater 23C serving as a heat source, the heater holder 24A serving as the heat source holder, the stay 25 serving as the support, the temperature sensor 26 serving as the temperature detector, and a first thermal conductor 181 serving as a thermal equalizer or a thermal conduction aid. The fixing belt 21 is the endless belt. The pressure roller 22 contacts an outer circumferential face of the fixing belt 21 to form the fixing nip N between the fixing belt 21 and the pressure roller 22. The heater 23C heats the fixing belt 21. The heater holder 24A holds or supports the heater 23C and the first thermal conductor 181. The stay 25 supports the heater holder 24A. The temperature sensor 26 detects a temperature of the first thermal conductor 181. The fixing belt 21, the pressure roller 22, the heater 23C, the heater holder 24A, the stay 25, and the first thermal conductor 181 extend in a longitudinal direction that is perpendicular to a paper surface of FIG. 24 and is parallel to a width direction of a sheet P conveyed through the fixing nip N, the longitudinal direction of the fixing belt 21, and an axial direction of the pressure roller 22.

Like the heater 23B depicted in FIG. 19, the heater 23C depicted in FIG. 24 includes a plurality of resistive heat generators 51B arranged in the longitudinal direction of the heater 23C with the gap E between the adjacent resistive heat generators 51B. However, with the plurality of resistive heat generators 51B arranged with the gap E between the adjacent resistive heat generators 51B, the heater 23C has a gap region disposed opposite the gap E between the adjacent resistive heat generators 51B and a heat generator region disposed opposite the resistive heat generator 51B. The gap region is subject to a decreased temperature that is lower than an increased temperature of the heat generator region. Accordingly, the fixing belt 21 may also suffer from temperature decrease in a gap region thereon disposed opposite the gap region of the heater 23C, resulting in uneven temperature of the fixing belt 21 in the longitudinal direction thereof.

Accordingly, also with the heater 23C depicted in FIG. 24, the fixing device 20F incorporates the first thermal conductor 181 that suppresses temperature decrease in the gap region of the fixing belt 21 and therefore suppresses uneven temperature of the fixing belt 21 in the longitudinal direction thereof.

A description is provided of a configuration of the first thermal conductor 181 in detail.

As illustrated in FIG. 24, the first thermal conductor 181 is interposed between the heater 23C and the stay 25 in a horizontal direction in FIG. 24. Specifically, the first thermal conductor 181 is sandwiched between the heater 23C and the heater holder 24A. For example, the first thermal conductor 181 has one face that contacts a back face of the base 50 of the heater 23C. The first thermal conductor 181 has another face (e.g., an opposite face opposite to the one face) that contacts the heater holder 24A.

The stay 25 includes two perpendicular portions 25*a* that extend in a thickness direction of the heater 23C and the like. Each of the perpendicular portions 25*a* has a contact face 25*a1* that contacts the heater holder 24A, supporting the heater holder 24A, the first thermal conductor 181, and the heater 23C. The contact faces 25*a1* are disposed outboard from the resistive heat generators 51B in an orthogonal direction (e.g., a vertical direction in FIG. 24) perpendicular to the longitudinal direction of the stay 25. Thus, the stay 25 suppresses conduction of heat thereto from the heater 23C, causing the heater 23C to heat the fixing belt 21 efficiently.

Figure 25:
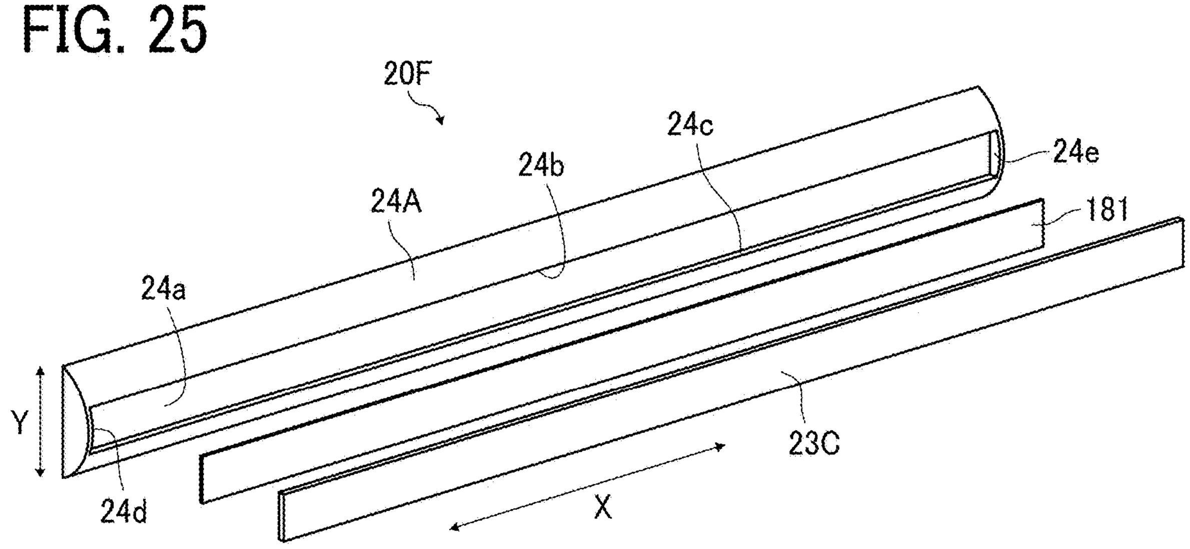
FIG. 25 is a perspective view of a heater, a first thermal conductor, and the heater holder incorporated in the fixing device depicted in FIG. 24.

As illustrated in FIG. 25, the first thermal conductor 181 is a plate having an even thickness. For example, the first thermal conductor 181 has a thickness of 0.3 mm, a length of 222 mm in the longitudinal direction X thereof, and a width of 10 mm in the short direction Y perpendicular to the longitudinal direction X thereof. In the fixing device 20F depicted in FIG. 25, the first thermal conductor 181 is constructed of a single plate. Alternatively, the first thermal conductor 181 may be constructed of a plurality of members.

The first thermal conductor 181 is fitted to the recess 24*a* of the heater holder 24A. The heater 23C is attached to the heater holder 24A from above the first thermal conductor 181. Thus, the heater holder 24A and the heater 23C sandwich and hold the first thermal conductor 181. In the fixing device 20F depicted in FIG. 25, the first thermal conductor 181 has a length in the longitudinal direction X thereof, that is equivalent to a length of the heater 23C in the longitudinal direction X thereof. The recess 24*a* includes the walls 24*d* and 24*e* (e.g., side walls) that extend in the short direction Y perpendicular to the longitudinal direction X of the recess 24*a*. The walls 24*d* and 24*e* serving as longitudinal direction restrictors, respectively, restrict motion of the first thermal conductor 181 and the heater 23C in the longitudinal direction X thereof. Thus, the walls 24*d* and 24*e* restrict shifting of the first thermal conductor 181 in the longitudinal direction X thereof inside the fixing device 20F, improving efficiency in conduction of heat in a target span in the longitudinal direction X of the first thermal conductor 181. The heater holder 24A further includes the walls 24*b* and 24*c* (e.g., side walls) that extend in the longitudinal direction X of the recess 24*a*. The walls 24*b* and 24*c*, serving as orthogonal direction restrictors, respectively, restrict motion of the first thermal conductor 181 and the heater 23C in an orthogonal direction (e.g., the short direction Y) perpendicular to the longitudinal direction X of the first thermal conductor 181.

Figure 26:
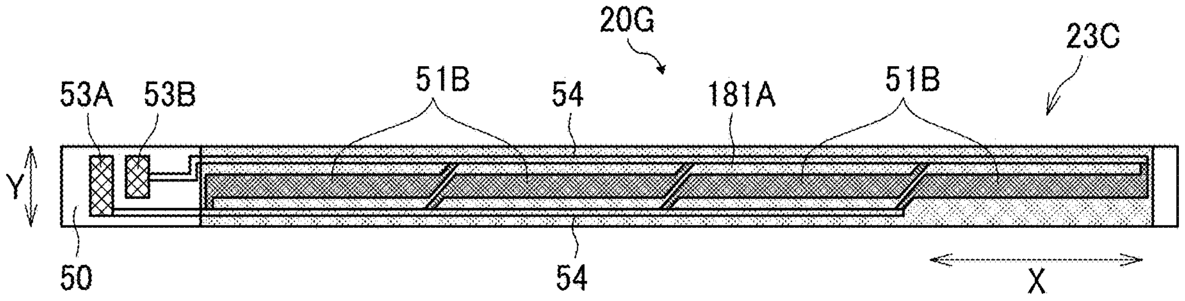
FIG. 26 is a plan view of the heater depicted in FIG. 25, illustrating an arrangement of a first thermal conductor as a variation of the first thermal conductor depicted in FIG. 25.

The first thermal conductor 181 may extend in a span other than a span in which the thermal conductor 181 extends in the longitudinal direction X thereof as illustrated in FIG. 25. For example, FIG. 26 illustrates the fixing device 20G including a first thermal conductor 181A that extends in a span hatched in FIG. 26 in which the resistive heat generators 51B are arranged in the longitudinal direction X of the heater 23C.

Figure 27:
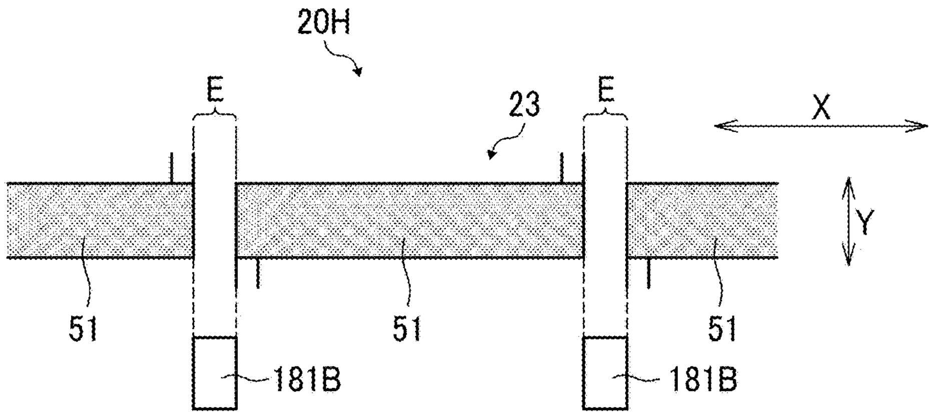
FIG. 27 is a plan view of the heater depicted in FIG. 3 and a plurality of first thermal conductors as another variation of the first thermal conductor depicted in FIG. 25, illustrating an arrangement of the first thermal conductors.

FIG. 27 illustrates the fixing device 20H including a plurality of first thermal conductors 181B. A part of the plurality of first thermal conductors 181B is disposed opposite an entire span of the gap E between the adjacent resistive heat generators 51 in the longitudinal direction X thereof. FIG. 27 illustrates the resistive heat generators 51 that are shifted from the first thermal conductors 181B vertically in FIG. 27 for convenience. Practically, the resistive heat generators 51 are substantially leveled with the first thermal conductors 181B in the short direction Y perpendicular to the longitudinal direction X of the resistive heat generators 51. Alternatively, a first thermal conductor (e.g., the first thermal conductors 181, 181A, and 181B) may span a part of a resistive heat generator (e.g., the resistive heat generators 51 and 51B) in the short direction Y perpendicular to the longitudinal direction X of the resistive heat generator.

Figure 28:
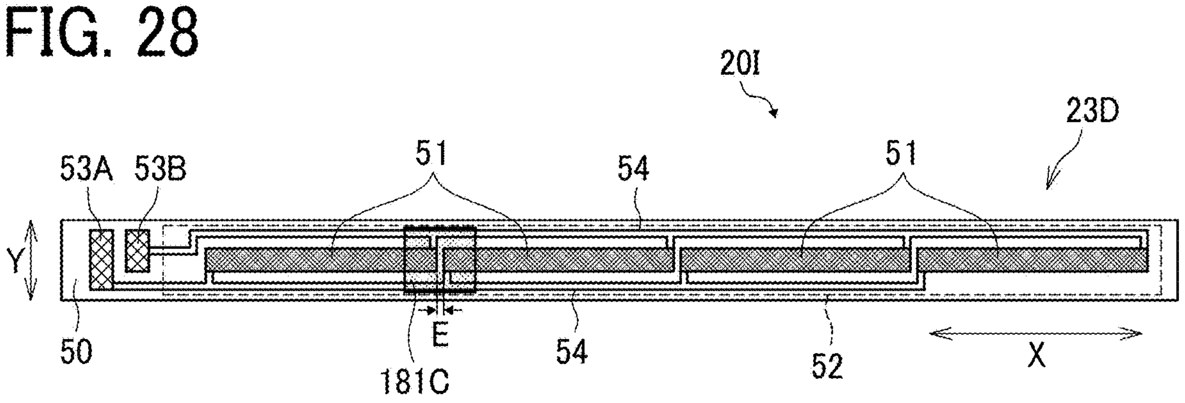
FIG. 28 is a plan view of a heater according to yet another embodiment of the present disclosure and a first thermal conductor as yet another variation of the first thermal conductor depicted in FIG. 25, illustrating an arrangement of the first thermal conductor.

FIG. 28 illustrates the fixing device 20I including a heater 23D and a first thermal conductor 181C. The first thermal conductor 181C spans an entirety of the resistive heat generator 51 in the short direction Y perpendicular to the longitudinal direction X of the resistive heat generator 51. As illustrated in FIG. 28, the first thermal conductor 181C is disposed opposite and spans the gap E in the longitudinal direction X of the heater 23D. Additionally, the first thermal conductor 181C bridges the adjacent resistive heat generators 51 that sandwich the gap E. A state in which the first thermal conductor 181C bridges the adjacent resistive heat generators 51 denotes a state in which the first thermal conductor 181C overlaps the adjacent resistive heat generators 51 at least partially in the longitudinal direction X of the heater 23D. Alternatively, a plurality of first thermal conductors 181C may be disposed opposite a plurality of gaps E of the heater 23D, respectively. As illustrated in FIG. 28, one or more first thermal conductors 181C may be disposed opposite a part of the plurality of gaps E. In the fixing device 20I depicted in FIG. 28, the single first thermal conductor 181C is disposed opposite the single gap E. A state in which the first thermal conductor 181, 181A, 181B, or 181C is disposed opposite the gap E denotes a state in which at least a part of the first thermal conductor 181, 181A, 181B, or 181C overlaps the gap E in the longitudinal direction X of the resistive heat generator 51 or 51B.

As illustrated in FIG. 24, as the pressure roller 22 applies pressure to a heater (e.g., the heaters 23, 23C, and 23D), the heater and a heater holder (e.g., the heater holder 24A) sandwich a first thermal conductor (e.g., the first thermal conductors 181, 181A, 181B, and 181C) such that the first thermal conductor contacts the heater and the heater holder. As the first thermal conductor contacts the heater, the first thermal conductor conducts heat generated by the heater in the longitudinal direction X thereof with improved efficiency. The first thermal conductor is disposed opposite one or more gaps E arranged in the longitudinal direction X of the heater. Thus, the first thermal conductor improves efficiency in conduction of heat at the gaps E, increases an amount of heat conducted to the gaps E, and increases the temperature of the heater at the gaps E. Accordingly, the first thermal conductor suppresses uneven temperature of the heater in the longitudinal direction X thereof, thereby suppressing uneven temperature of the fixing belt 21 in the longitudinal direction X thereof. Consequently, the fixing belt 21 suppresses uneven fixing and uneven gloss of a toner image fixed on a sheet P. The heater does not increase an amount of heat generation to attain sufficient fixing performance at the gaps E, causing a fixing device (e.g., the fixing devices 20F, 20G, 20H, and 20I) to save energy. For example, in a case that the fixing device (e.g., the fixing devices 20F and 20G) incorporates the first thermal conductor (e.g., the first thermal conductors 181 and 181A) that spans an entire region where the resistive heat generators (e.g., the resistive heat generators 51B) are arranged in the longitudinal direction X thereof, the first thermal conductor improves efficiency in conduction of heat of the heater 23C in an entirety of a main heating span of the heater 23C, that is disposed opposite an imaging span of a toner image formed on a sheet P conveyed through the fixing nip N. Accordingly, the first thermal conductor suppresses uneven temperature of the heater 23C and the fixing belt 21 in the longitudinal direction X thereof.

The first thermal conductor (e.g., the first thermal conductors 181, 181A, 181B, and 181C) is coupled with the resistive heat generators (e.g., the resistive heat generators 51 and 51B) having a positive temperature coefficient (PTC), suppressing overheating of the fixing belt 21 in a non-conveyance span where a sheet P having the decreased size is not conveyed effectively. The PTC property defines a property in which the resistance value increases as the temperature increases, for example, a heater output decreases under a given voltage. For example, the resistive heat generator having the PTC property suppresses an amount of heat generation in the non-conveyance span effectively. Additionally, the first thermal conductor efficiently conducts heat from the non-conveyance span on the fixing belt 21 that suffers from temperature increase to a sheet conveyance span on the fixing belt 21 where the sheet P is conveyed. The PTC property of the resistive heat generator and heat conduction of the first thermal conductor attain a synergistic effect that suppresses overheating of the fixing belt 21 in the non-conveyance span effectively.

Figure 29:
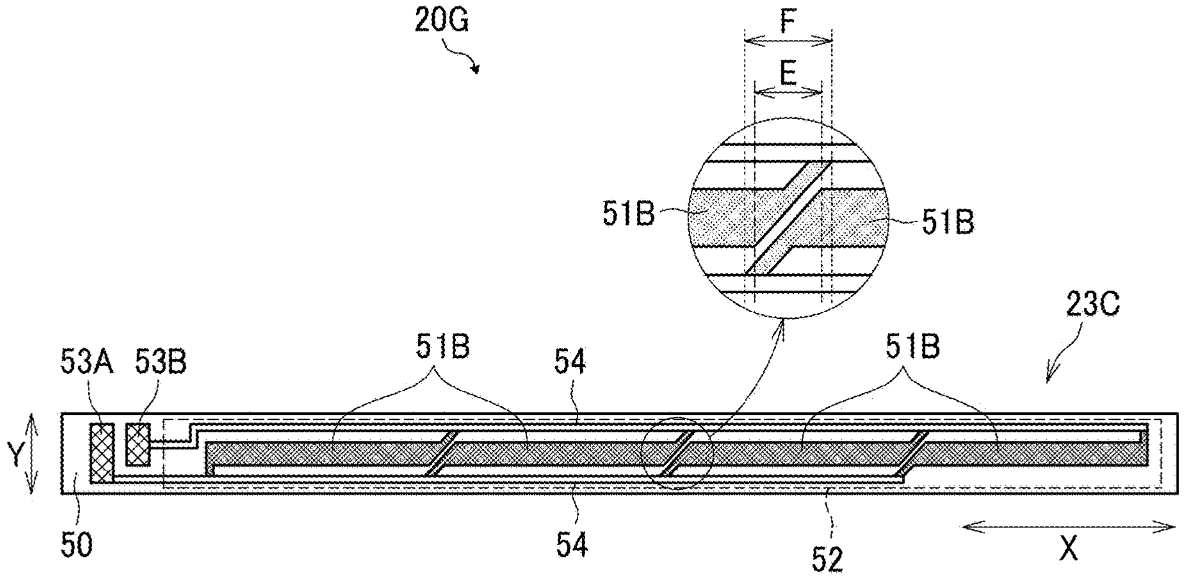
FIG. 29 is a plan view of the heater depicted in FIG. 26, illustrating an enlarged dividing region between resistive heat generators incorporated in the heater.

Since the heater (e.g., the heaters 23, 23C, and 23D) generates heat in a decreased amount at the gap E, the heater has a decreased temperature also in a periphery of the gap E. To address the circumstance, the first thermal conductor is preferably disposed also in the periphery of the gap E. For example, as illustrated in FIG. 29, the first thermal conductor (e.g., the first thermal conductors 181, 181A, and 181C) is disposed opposite an enlarged gap region F encompassing the gap E and the periphery of the gap E. The first thermal conductor improves efficiency in conduction of heat at the gap E and the periphery of the gap E in the longitudinal direction X of the heater 23C, suppressing uneven temperature of the heater 23C in the longitudinal direction X thereof more effectively. The first thermal conductor (e.g., the first thermal conductors 181 and 181A) spans an entire region where the resistive heat generators 51B are arranged in the longitudinal direction X of the heater 23C, suppressing uneven temperature of the heater 23C and the fixing belt 21 in the longitudinal direction X thereof more precisely.

Figure 30:
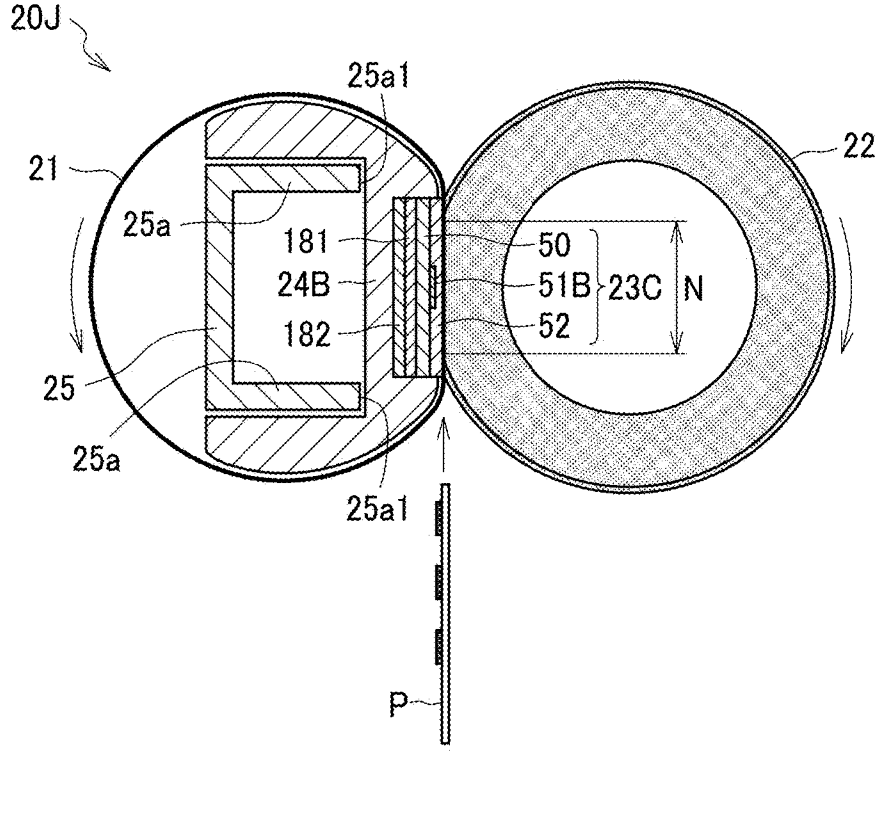
FIG. 30 is a schematic cross-sectional view of a fixing device according to yet another embodiment of the present disclosure to which the pressure switching device depicted in FIG. 5 is applied.

FIG. 30 is a schematic cross-sectional view of the fixing device 20J to which the pressure switching device 30 is applied.

As illustrated in FIG. 30, the fixing device 20J includes a heater holder 24B and a plurality of second thermal conductors 182 that is interposed between the heater holder 24B and the first thermal conductor 181. The second thermal conductors 182 are disposed at a position different from a position of the first thermal conductor 181 in a laminating direction (e.g., a horizontal direction in FIG. 30) in which the stay 25, the heater holder 24B, the second thermal conductors 182, the first thermal conductor 181, and the heater 23C are arranged. Specifically, the second thermal conductors 182 are layered on the first thermal conductor 181. Like the fixing device 20F incorporating the temperature sensor 26 depicted in FIG. 24, the fixing device 20J depicted in FIG. 30 incorporates the temperature sensor 26. FIG. 30 illustrates a cross section of the fixing device 20J in which the temperature sensor 26 is not disposed.

The second thermal conductors 182 are made of a material having a thermal conductivity greater than a thermal conductivity of the base 50. For example, the second thermal conductors 182 are made of graphene or graphite. In the fixing device 20J depicted in FIG. 30, each of the second thermal conductors 182 is a graphite sheet having a thickness of 1 mm. Alternatively, each of the second thermal conductors 182 may be a plate made of aluminum, copper, silver, or the like.

Figure 31:
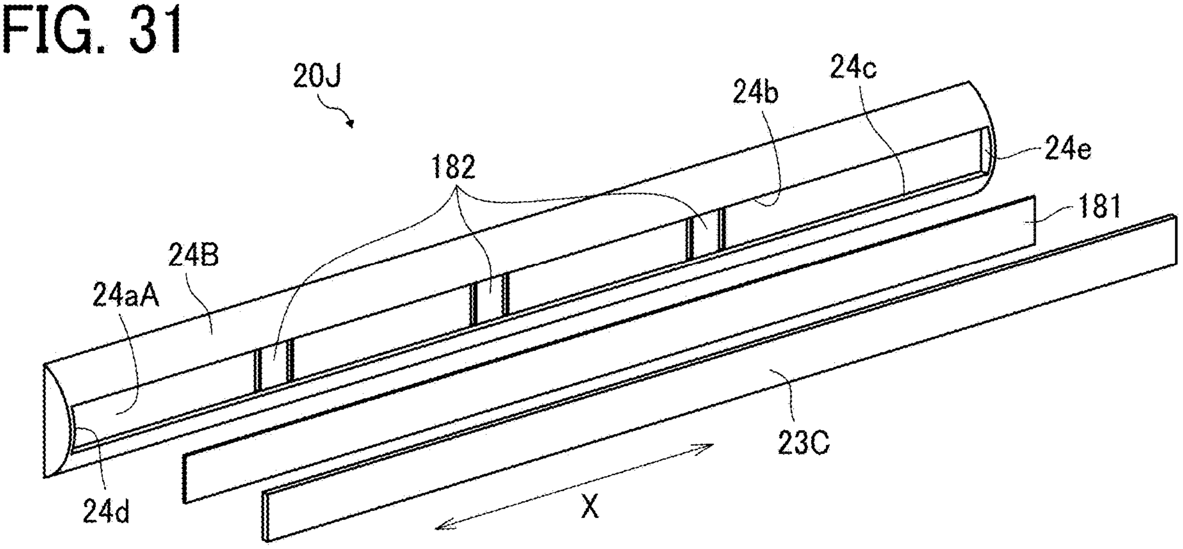
FIG. 31 is a perspective view of the heater, the first thermal conductor, a plurality of second thermal conductors, and a heater holder incorporated in the fixing device depicted in FIG. 30.

As illustrated in FIG. 31, the heater holder 24B includes a recess 24*a*A in which the plurality of second thermal conductors 182 is placed. The adjacent second thermal conductors 182 sandwich a clearance in the longitudinal direction X of the heater holder 24B. The heater holder 24B includes cavities placed with the second thermal conductors 182, respectively. The cavities are stepped down by one step from other portion of the heater holder 24B. The second thermal conductor 182 and the heater holder 24B define clearances therebetween at both lateral ends of the second thermal conductor 182 in the longitudinal direction X of the heater holder 24B. The clearances suppress conduction of heat from the second thermal conductor 182 to the heater holder 24B, causing the heater 23C to heat the fixing belt 21 efficiently.

Figure 32:
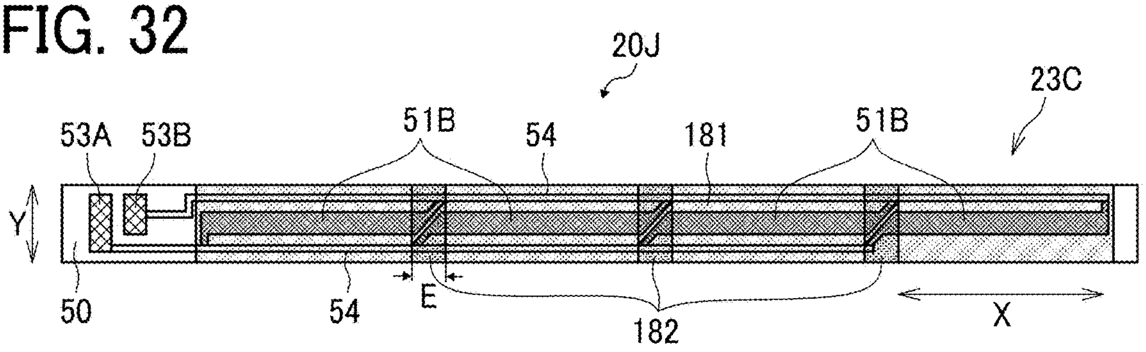
FIG. 32 is a plan view of the heater, the first thermal conductor, and the second thermal conductors depicted in FIG. 31, illustrating an arrangement of the first thermal conductor and the second thermal conductors.

As illustrated in FIG. 32, the second thermal conductor 182 that is hatched is disposed opposite the gap E between the adjacent resistive heat generators 51B and overlaps at least a part of the adjacent resistive heat generators 51B in the longitudinal direction X thereof. In the fixing device 20J depicted in FIG. 32, the second thermal conductor 182 spans an entirety of the gap E. With the heater 23C illustrated in FIG. 32 and FIG. 34 that is referred to in a description below, the first thermal conductor 181 spans the entire region where the resistive heat generators 51B are arranged in the longitudinal direction X thereof. Alternatively, the first thermal conductor 181 may span a region that is different from the region depicted in FIGS. 32 and 34.

As described above, in addition to the first thermal conductor 181, the second thermal conductor 182 is disposed opposite the gap E and overlaps at least a part of the adjacent resistive heat generators 51B in the longitudinal direction X thereof. The second thermal conductor 182 further improves efficiency in conduction of heat at the gap E in the longitudinal direction X of the heater 23C, suppressing uneven temperature of the heater 23C in the longitudinal direction X thereof more effectively.

Figure 33:
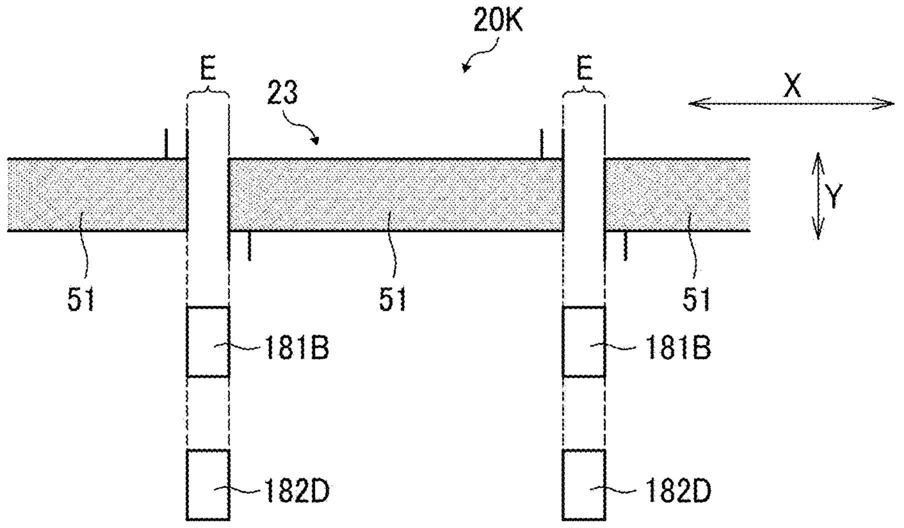
FIG. 33 is a plan view of the heater depicted in FIG. 3, illustrating an arrangement of first thermal conductors and second thermal conductors as a variation of the first thermal conductor and the second thermal conductors depicted in FIG. 32.

FIG. 33 illustrates the fixing device 20K including the first thermal conductors 181B and a plurality of second thermal conductors 182D. A part of the first thermal conductors 181B and the second thermal conductors 182D is disposed opposite the entire span of the gap E in the longitudinal direction X of the resistive heat generator 51. Accordingly, the first thermal conductor 181B and the second thermal conductor 182D improve efficiency in conduction of heat at the gap E compared to other region defined by the resistive heat generators 51, which is other than the gap E. FIG. 33 illustrates the resistive heat generators 51 that are shifted from the first thermal conductors 181B and the second thermal conductors 182D vertically in FIG. 33 for convenience. Practically, the resistive heat generators 51 are substantially leveled with the first thermal conductors 181B and the second thermal conductors 182D in the short direction Y perpendicular to the longitudinal direction X of the resistive heat generators 51. Alternatively, the first thermal conductors 181B and the second thermal conductors 182D may be disposed with respect to the resistive heat generators 51 with other arrangement. For example, the first thermal conductor 181B and the second thermal conductor 182D may span a part of the resistive heat generator 51 in the short direction Y of the resistive heat generator 51. The first thermal conductor 181B and the second thermal conductor 182D may span or cover the entirety of the resistive heat generator 51 in the short direction Y of the resistive heat generator 51.

Each of a first thermal conductor (e.g., the first thermal conductors 181, 181A, 181B, and 181C) and a second thermal conductor (e.g., the second thermal conductors 182 and 182D) may be the graphene sheet. In this case, each of the first thermal conductor and the second thermal conductor has an enhanced thermal conductivity in a predetermined direction along a surface of the graphene sheet, that is, the longitudinal direction X, not a thickness direction of the graphene sheet. Accordingly, each of the first thermal conductor and the second thermal conductor suppresses uneven temperature of a heater (e.g., the heaters 23 and 23C) and the fixing belt 21 in the longitudinal direction X thereof effectively.

Figure 34:
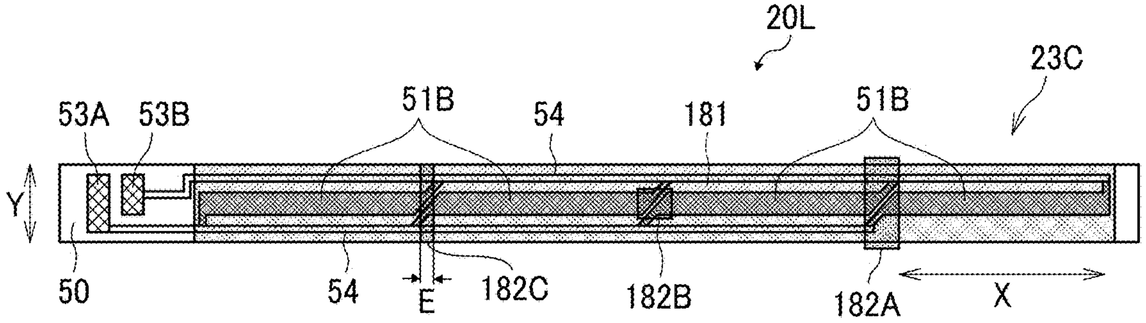
FIG. 34 is a plan view of the heater depicted in FIG. 32 and second thermal conductors as another variation of the second thermal conductors depicted in FIG. 32, illustrating an arrangement of the second thermal conductors.

The second thermal conductor 182 is disposed opposite the gap E between the adjacent resistive heat generators 51B or the enlarged gap region F depicted in FIG. 29 and overlaps at least a part of the adjacent resistive heat generators 51B in the longitudinal direction X of the heater 23C. Hence, the second thermal conductor 182 may be positioned with respect to the resistive heat generators 51B differently from the second thermal conductor 182 depicted in FIG. 32. For example, FIG. 34 illustrates the fixing device 20L including second thermal conductors 182A, 182B, and 182C. The second thermal conductor 182A protrudes beyond the base 50 bidirectionally in the short direction Y perpendicular to the longitudinal direction X of the heater 23C. The second thermal conductor 182B is disposed opposite a span of the resistive heat generator 51B in the short direction Y of the heater 23C. The second thermal conductor 182C spans a part of the gap E.

Figure 35:
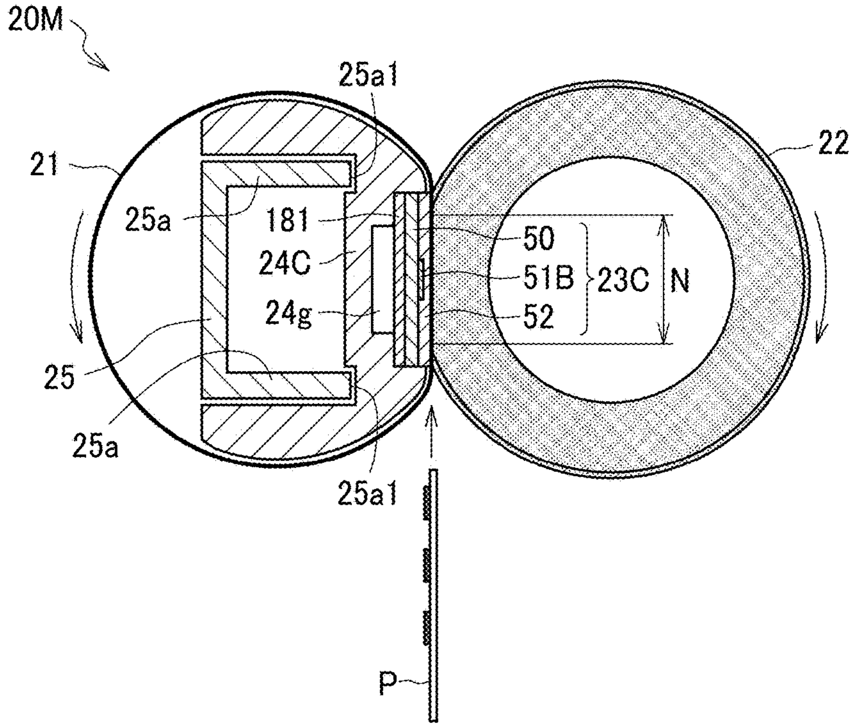
FIG. 35 is a schematic cross-sectional view of a fixing device according to yet another embodiment of the present disclosure to which the pressure switching device depicted in FIG. 5 is applied.

FIG. 35 illustrates the fixing device 20M including a heater holder 24C. The heater holder 24C and the first thermal conductor 181 define a clearance therebetween in a thickness direction of the heater holder 24C (e.g., a horizontal direction in FIG. 35). For example, the heater holder 24C includes the recess **24*a*A depicted in FIG. 31 that accommodates the heater 23C, the first thermal conductor 181, and the second thermal conductors 182. The heater holder 24C includes a retracted portion 24*g* serving as a thermal insulation layer disposed at a part of the recess 24*a*A. The retracted portion 24*g* is disposed at a part of the recess 24*a*A, that is outboard from a portion of the recess 24*a*A, that is placed with the second thermal conductor 182, in the longitudinal direction X of the heater holder 24C. FIG. 35 omits illustration of the second thermal conductor 182. A part of the recess 24*a*A of the heater holder 24C is deepened compared to other part of the recess 24*a*A to produce the retracted portion 24*g*. Accordingly, the heater holder 24C contacts the first thermal conductor 181 with a minimum contact area, suppressing conduction of heat from the first thermal conductor 181 to the heater holder 24C and causing the heater 23C to heat the fixing belt 21 efficiently. On a cross section that intersects a longitudinal direction of the fixing device 20M and is provided with the second thermal conductor 182, the second thermal conductor 182 contacts the heater holder 24C like the second thermal conductor 182 of the fixing device 20J described above with reference to FIG. 30**.

The fixing device 20M depicted in FIG. 35 includes the retracted portion **24*g* that spans an entirety of the resistive heat generator 51B in the short direction Y thereof (e.g., a vertical direction in FIG. 35). Accordingly, the retracted portion 24*g* suppresses conduction of heat from the first thermal conductor 181 to the heater holder 24C effectively, improving efficiency in heating of the fixing belt 21 by the heater 23C. Alternatively, instead of the retracted portion 24*g* that defines the clearance, the fixing device 20M may incorporate a thermal insulator that has a thermal conductivity smaller than a thermal conductivity of the heater holder 24**C, as the thermal insulation layer.

In the fixing device 20M, the second thermal conductor 182 is provided separately from the first thermal conductor 181. Alternatively, the fixing device 20M may have other configuration. For example, the first thermal conductor 181 may include an opposed portion that is disposed opposite the gap E and has a thickness greater than a thickness of an outboard portion of the first thermal conductor 181, that is other than the opposed portion. Thus, the first thermal conductor 181 also achieves a function of the second thermal conductor 182.

Figure 36:
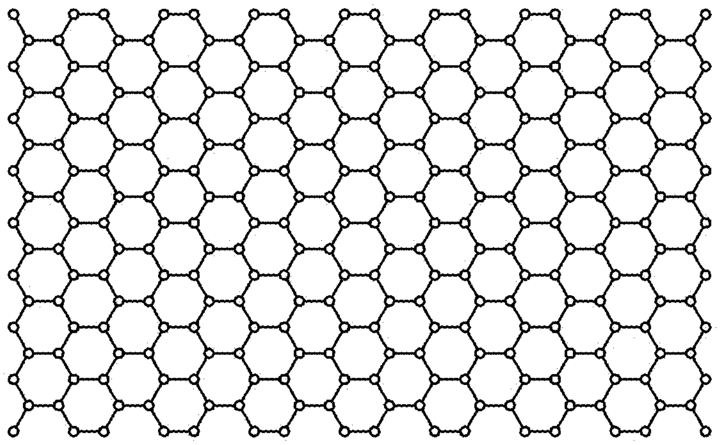
FIG. 36 is a diagram of a crystalline structure of atoms of graphene.
Figure 37:
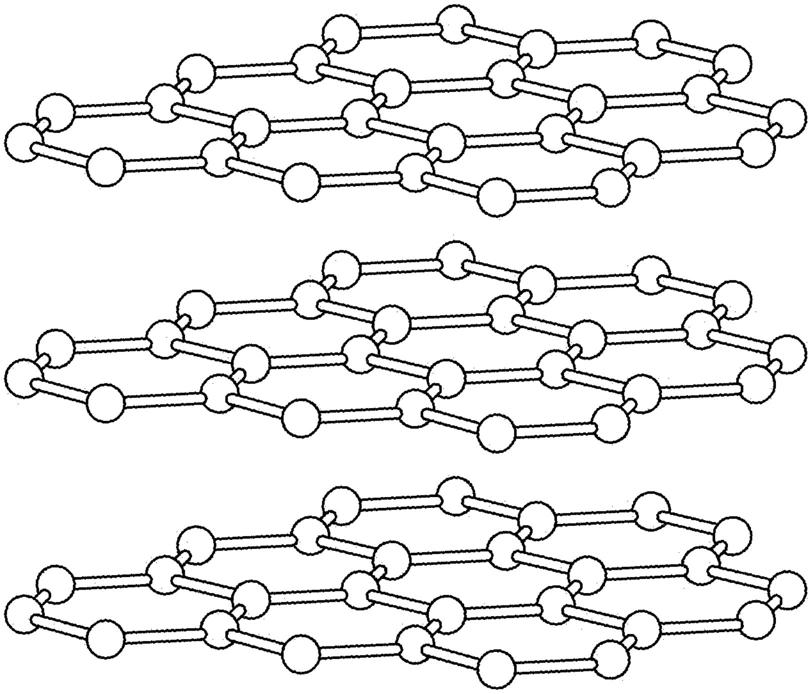
FIG. 37 is a diagram of a crystalline structure of atoms of graphite.

Referring to FIGS. 36 and 37, a description is provided of a configuration of each of the graphene sheet and the graphite sheet.

Graphene is thin powder. As illustrated in FIG. 36, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms or may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene $C_{60}$, $C_{70}$, and $C_{80}$, 3-coordinated carbon atoms, or the like.

The graphene sheet is artificial and is produced by chemical vapor deposition (CVD), for example.

The graphene sheet is commercially available. A size and a thickness of the graphene sheet and a number of layers and the like of the graphite sheet described below are measured with a transmission electron microscope (TEM), for example.

Graphite is constructed of stacked layers of graphene and is highly anisotropic in thermal conduction. As illustrated in FIG. 37, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers. For example, a first thermal conductor (e.g., the first thermal conductors 181, 181A, 181B, and 181C) or a second thermal conductor (e.g., the second thermal conductors 182, 182A, 182B, 182C, and 182D) is made of graphite. Accordingly, the first thermal conductor or the second thermal conductor attains an efficiency in conduction of heat in the longitudinal direction X of a heater (e.g., the heaters 23, 23C, and 23D), which is greater than an efficiency in conduction of heat in a thickness direction, that is, the laminating direction (e.g., the horizontal direction in FIG. 30) in which the stay 25, the heater holder 24B, the second thermal conductor 182, the first thermal conductor 181, and the heater 23C are arranged, thus suppressing conduction of heat to a heater holder (e.g., the heater holders 24A, 24B, and 24C). Consequently, the first thermal conductor or the second thermal conductor suppresses uneven temperature of the heater in the longitudinal direction X thereof efficiently. Additionally, the first thermal conductor or the second thermal conductor minimizes heat conducted to the heater holder. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, a fixing device (e.g., the fixing devices 20F, 20G, 20H, 20I, 20J, 20K, 20L, and 20M) employs the graphite sheet having a decreased thickness to decrease thermal capacity of the fixing device. In a case that the fixing nip N and the heater have an increased length in the longitudinal direction X thereof, the first thermal conductor or the second thermal conductor also has an increased length in the longitudinal direction X of the heater.

In view of increasing mechanical strength, the graphite sheet preferably has a number of layers that is not smaller than 11 layers. The graphite sheet may include a part constructed of a single layer and another part constructed of a plurality of layers.

Figure 38:
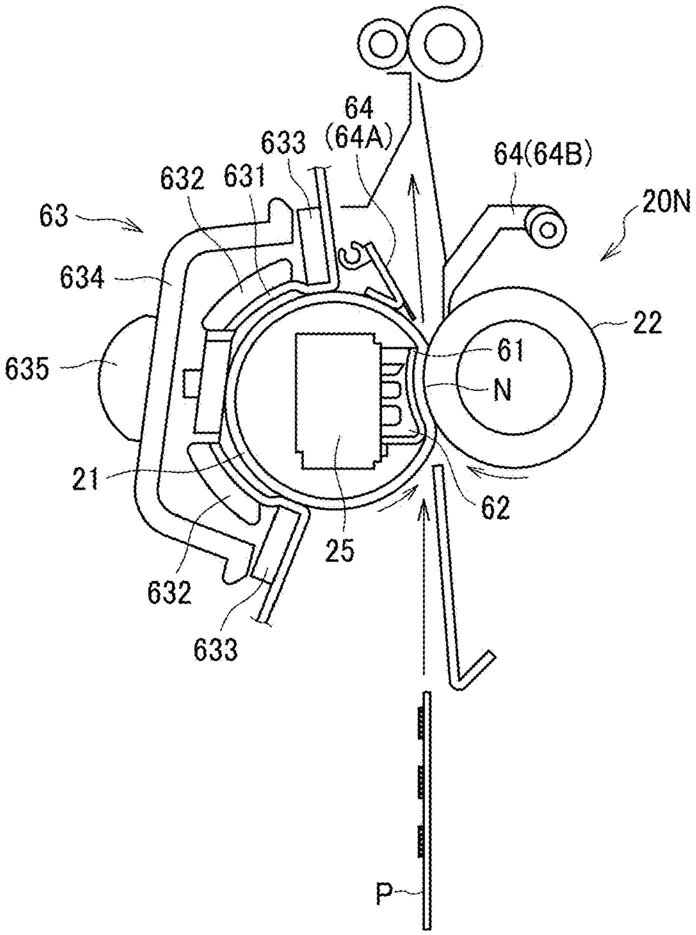
FIG. 38 is a schematic cross-sectional view of a fixing device according to yet another embodiment of the present disclosure to which the pressure switching device depicted in FIG. 5 is applied.

The pressure switching device 30 according to the embodiments of the present disclosure is also applied to a fixing device 20N depicted in FIG. 38.

As illustrated in FIG. 38, the fixing device 20N includes an induction heater (IH) 63 that heats the fixing belt 21 by electromagnetic induction heating. In addition to the induction heater 63, the fixing device 20N includes the fixing belt 21, the pressure roller 22, the stay 25, a nip formation pad 62, a slide sheet 61, and a separator 64. The separator 64 includes a separation plate 64A and a separation claw 64B.

The induction heater 63 is disposed opposite the outer circumferential face of the fixing belt 21. The induction heater 63 is secured to the apparatus body 1001. The induction heater 63 includes coils 632, cores 633, 634, and 635, and a coil holder 631. The coil holder 631 holds the coils 632. As the power supply supplies power to the coils 632, a magnetic field generates around the coils 632. An eddy current generates on the base layer of the fixing belt 21. The base layer is made of metal. As the eddy current generates, an electric resistance of the base layer of the fixing belt 21 generates Joule heat. Thus, the fixing belt 21 generates heat. The cores 633, 634, and 635 are made of a ferromagnetic material. The cores 633, 634, and 635 form a magnetic path through which the magnetic field (e.g., a magnetic flux) generated by the coils 632 passes.

The nip formation pad 62 presses against the pressure roller 22 via the fixing belt 21, forming the fixing nip N between the fixing belt 21 and the pressure roller 22. The stay 25 supports the nip formation pad 62. The slide sheet 61 impregnated with a lubricant is interposed between the fixing belt 21 and the nip formation pad 62. The slide sheet 61 and the lubricant that are interposed between the fixing belt 21 and the nip formation pad 62 decrease sliding friction that generates between the nip formation pad 62 and the fixing belt 21 that slides over the nip formation pad 62.

Figure 39:
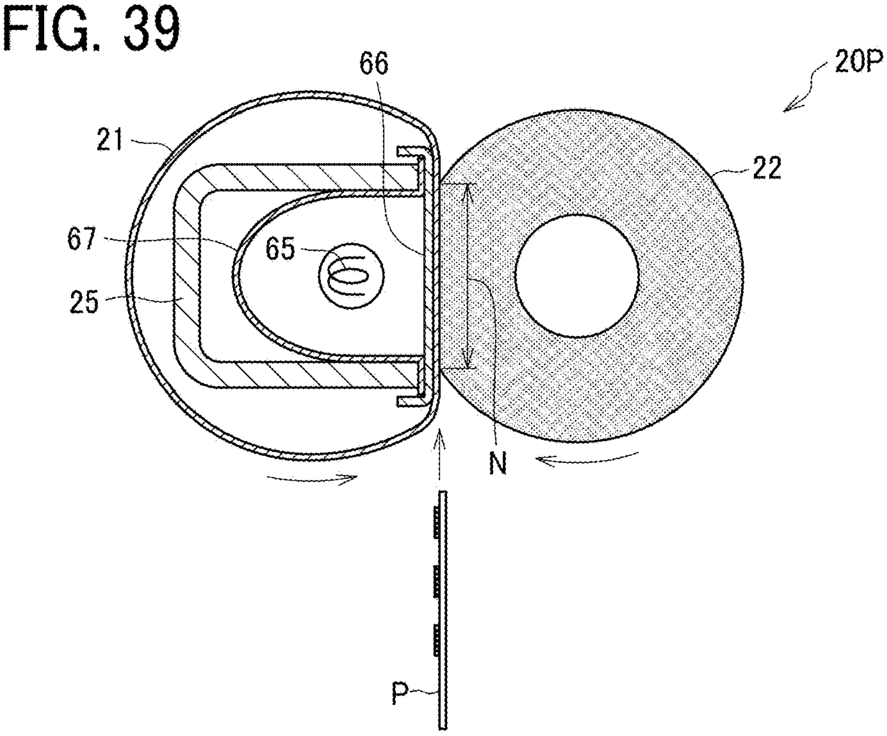
FIG. 39 is a schematic cross-sectional view of a fixing device according to yet another embodiment of the present disclosure to which the pressure switching device depicted in FIG. 5 is applied.

The pressure switching device 30 according to the embodiments of the present disclosure is also applied to a fixing device 20P depicted in FIG. 39.

As illustrated in FIG. 39, the fixing device 20P includes a halogen heater 65 that heats the fixing belt 21. In addition to the halogen heater 65, the fixing device 20P includes the fixing belt 21, the pressure roller 22, the stay 25, a nip formation pad 66, and a reflector 67.

The nip formation pad 66 presses against the pressure roller 22 via the fixing belt 21, forming the fixing nip N between the fixing belt 21 and the pressure roller 22. The stay 25 supports the nip formation pad 66 and the reflector 67. The nip formation pad 66 is disposed opposite the halogen heater 65 disposed within a loop formed by the fixing belt 21. Hence, infrared light radiated from the halogen heater 65 irradiates the nip formation pad 66. Accordingly, the halogen heater 65 heats the nip formation pad 66. Heat is conducted from the nip formation pad 66 to the fixing belt 21 at the fixing nip N, heating the fixing belt 21. In order to conduct heat from the nip formation pad 66 to the fixing belt 21 efficiently, the nip formation pad 66 is preferably made of a material having a thermal conductivity greater than a thermal conductivity of the stay 25. For example, the nip formation pad 66 is made of copper, aluminum, or the like.

The reflector 67 disposed within the loop formed by the fixing belt 21 reflects a part of the infrared light radiated from the halogen heater 65 to the nip formation pad 66. Accordingly, the halogen heater 65 heats the nip formation pad 66 effectively. Since the reflector 67 is interposed between the stay 25 and the halogen heater 65, the reflector 67 prevents the infrared light radiated from the halogen heater 65 from irradiating the stay 25 and suppresses conduction of heat from the halogen heater 65 to the stay 25, saving energy.

The above describes the constructions of various fixing devices (e.g., the fixing devices 20, 20A, 20B, 20C, 20D, 20E, 20F, 20G, 20H, 20I, 20J, 20K, 20L, 20M, 20N, and 20P) to which the embodiments of the present disclosure are applied.

The pressure switching device 30 according to the embodiments of the present disclosure is also applied to a heating device other than the fixing devices. For example, the pressure switching device 30 according to the embodiments of the present disclosure is also applied to a heating device such as a dryer that dries liquid such as ink applied on a sheet, a laminator that bonds film as a coating member onto a surface of a sheet by thermocompression, and a heat sealer that bonds sealing portions of a packaging material by thermocompression.

The pressure switching device 30 according to the embodiments of the present disclosure is also applied to a pressure switching device that decreases pressure between the intermediate transfer belt 11 and the secondary transfer roller 13 depicted in FIG. 1 so that the operator removes a sheet P jammed between the intermediate transfer belt 11 and the secondary transfer roller 13. The pressure switching device 30 according to the embodiments of the present disclosure is also applied to a pressure switching device that switches pressure between rollers other than pressure between a belt and a roller.

Like the pressure switching device 30 according to the first embodiment of the present disclosure, the pressure switching devices incorporate the vibration isolating member 45 that is mounted on the operation member 34 at the contact position where the switch 33 is disposed opposite the operation member 34. The slide aid 56 is mounted on the vibration isolating member 45 on the contact face thereof where the switch 33 is disposed opposite the vibration isolating member 45, improving motion of the switch 33 and reducing the collision noise.

Figure 44:
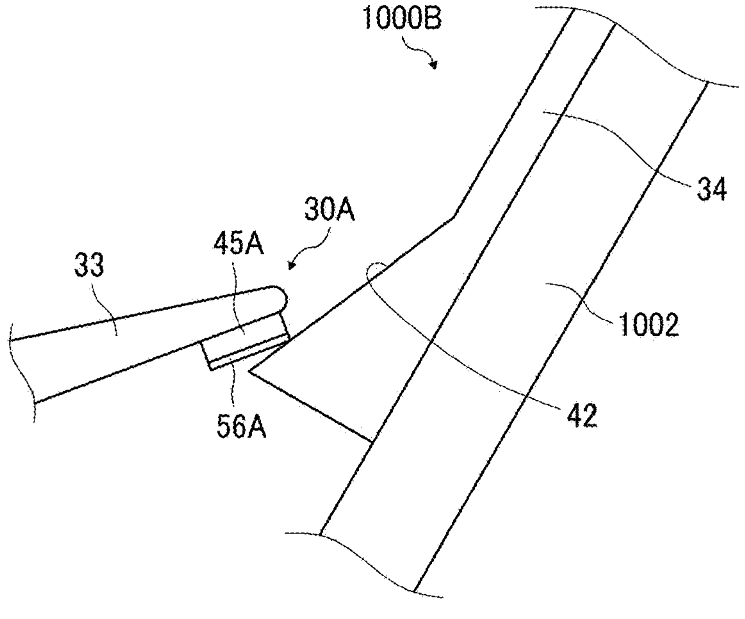
FIG. 44 is a partial cross-sectional view of an image forming apparatus according to yet another embodiment of the present disclosure.

FIG. 44 illustrates an image forming apparatus 1000B including a pressure switching device 30A according to a second embodiment of the present disclosure. The pressure switching device 30A includes a vibration isolating member 45A and a slide aid 56A that are mounted on the switch 33 instead of the operation member 34. For example, the pressure switching device 30A depicted in FIG. 44 incorporates the vibration isolating member 45A and the slide aid 56A that are mounted on the switch 33 that pivots about the fulcrum 35 serving as a first fulcrum depicted in FIG. 5 and switches between the pressing state and the pressure decrease state of two opposed members (e.g., the fixing belt 21 and the pressure roller 22). The pressure switching device 30 depicted in FIG. 11 incorporates the vibration isolating member 45 and the slide aid 56 that are mounted on the operation member 34 that pivots about the fulcrum 36 serving as a second fulcrum depicted in FIG. 5 and pivots the switch 33 about the fulcrum 35 serving as the first fulcrum in the pivot direction C. In other words, in order to cause the slide aid 56 or 56A to contact one of the switch 33 and the operation member 34 when the operation member 34 moves toward the switch 33, the slide aid 56 or 56A is mounted on another one of the switch 33 and the operation member 34. The vibration isolating member 45 or 45A is interposed between the slide aid 56 or 56A and the another one of the switch 33 and the operation member 34, that mounts the slide aid 56 or 56A.

Each of the pressure switching devices 30 and 30A according to the embodiments of the present disclosure is manually operated by the operator who opens and closes the cover 1002 interlocked with the pressure switching device 30 or 30A or is automatically operated by a driver such as an electric motor.

The above describes the construction of the pressure switching device 900 depicted in FIGS. 40 to 43 as the comparative example that is different from the pressure switching device 30 according to the first embodiment of the present disclosure. However, the pressure switching device 900 as the comparative example may also be applied with the technology of the present disclosure, improving motion of the switch 903 and reducing the collision noise.

With the embodiments of the present disclosure described above, the technology of the present disclosure encompasses a pressure switching device (e.g., the pressure switching devices 30 and 30A) and an image forming apparatus (e.g., the image forming apparatuses 1000, 1000A, and 1000B) that have at least one of aspects described below.

A description is provided of a first aspect of the technology of the present disclosure.

As illustrated in FIGS. 5, 11, and 44, the pressure switching device of the first aspect includes a first fulcrum (e.g., the fulcrum 35), a switch (e.g., the switch 33), a second fulcrum (e.g., the fulcrum 36), an operation member (e.g., the operation member 34), a slide aid (e.g., the slide aids 56 and 56A), and a vibration isolating member (e.g., the vibration isolating members 45 and 45A).

As the switch pivots about the first fulcrum, the switch switches between a pressing state in which a first opposed member presses against a second opposed member and a pressure decrease state in which the first opposed member is disposed opposite the second opposed member with one of no pressure and decreased pressure between the first opposed member and the second opposed member. As the operation member pivots about the second fulcrum, the operation member pivots the switch about the first fulcrum in a pivot direction (e.g., the pivot direction C). In order to cause the slide aid to contact one of the switch and the operation member as the operation member moves toward the switch, the slide aid is mounted on another one of the switch and the operation member. The vibration isolating member is interposed between the slide aid and the another one of the switch and the operation member. The slide aid has a hardness that is greater than a hardness of the vibration isolating member.

A description is provided of a second aspect of the technology of the present disclosure.

As illustrated in FIG. 11, in the pressure switching device according to the first aspect, the vibration isolating member is mounted on the operation member.

A description is provided of a third aspect of the technology of the present disclosure.

As illustrated in FIGS. 11 and 44, in the pressure switching device according to the first aspect or the second aspect, the slide aid is thinner than the vibration isolating member. For example, the slide aid has a thickness (e.g., the thickness t2) that is smaller than a thickness (e.g., the thickness t1) of the vibration isolating member.

A description is provided of a fourth aspect of the technology of the present disclosure.

In the pressure switching device according to the third aspect, the thickness of the vibration isolating member is not smaller than 1.0 mm and not greater than 3.0 mm. The thickness of the slide aid is not smaller than 0.1 mm and not greater than 0.3 mm.

A description is provided of a fifth aspect of the technology of the present disclosure.

In the pressure switching device according to any one of the first aspect to the fourth aspect, the vibration isolating member is made of a material containing urethane foam.

A description is provided of a sixth aspect of the technology of the present disclosure.

In the pressure switching device according to any one of the first aspect to the fifth aspect, the slide aid is made of a material containing polyethylene terephthalate.

A description is provided of a seventh aspect of the technology of the present disclosure.

In the pressure switching device according to any one of the first aspect to the sixth aspect, as illustrated in FIG. 12, the switch or the operation member contacts the slide aid with a contact width (e.g., the contact width W1) that is not smaller than a half of a width (e.g., the width W2) of the slide aid in a contact width direction (e.g., the contact width direction W33) that is perpendicular to a slide direction (e.g., the slide direction S33) in which the switch or the operation member slides over the slide aid and is perpendicular to a thickness direction (e.g., the thickness direction T56) of the slide aid.

A description is provided of an eighth aspect of the technology of the present disclosure.

As illustrated in FIG. 5, an image forming apparatus (e.g., the image forming apparatuses 1000, 1000A, and 1000B) includes the pressure switching device according to any one of the first aspect to the seventh aspect.

A description is provided of a ninth aspect of the technology of the present disclosure.

As illustrated in FIG. 5, the image forming apparatus according to the eighth aspect further includes a heating device (e.g., the fixing devices 20, 20A, 20B, 20C, 20D, 20E, 20F, 20G, 20H, 20I, 20J, 20K, 20L, 20M, 20N, and 20P), an apparatus body (e.g., the apparatus body 1001), and a cover (e.g., the cover 1002). The heating device includes a first rotator (e.g., the fixing belt 21 and the belt 162) and a second rotator (e.g., the pressure rollers 22 and 152 and the center roller 163).

The pressure switching device switches between a pressing state in which the first rotator presses against the second rotator and a pressure decrease state in which the first rotator is disposed opposite the second rotator with one of no pressure and decreased pressure between the first rotator and the second rotator. The switch is disposed inside the apparatus body or the heating device. The operation member is mounted on the cover that opens and closes with respect to the apparatus body.

A description is provided of a tenth aspect of the technology of the present disclosure.

With the pressure switching device according to any one of the first aspect to the seventh aspect, a pressure switching method changes pressure applied between two opposed members, that is, the first opposed member and the second opposed member.

Figure 45:
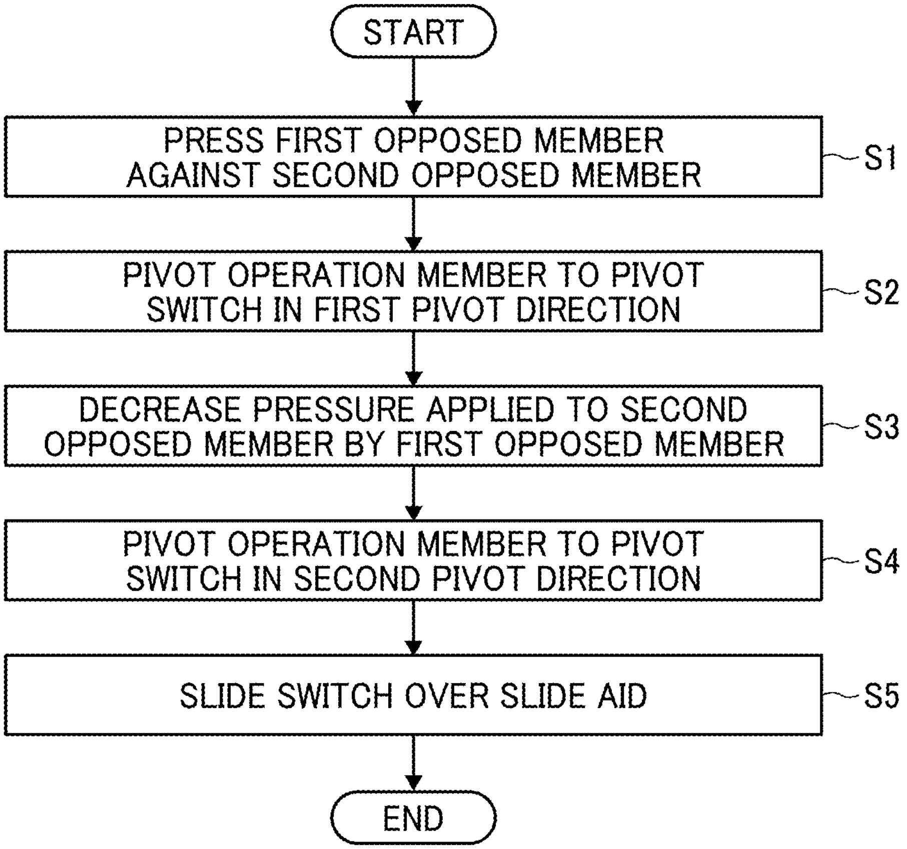
FIG. 45 is a flowchart of a pressure switching method performed by the pressure switching device depicted in FIG. 5.

For example, FIG. 45 is a flowchart of the pressure switching method.

In step S1, the first opposed member is pressed against the second opposed member in the pressing state as illustrated in FIG. 6.

In step S2, as the cover is opened, the operation member mounted on the cover pivots about the second fulcrum to pivot the switch about the first fulcrum in a first pivot direction (e.g., the pivot direction C1) as illustrated in FIG. 6.

In step S3, pressure applied to the second opposed member by the first opposed member decreases in the pressure decrease state as illustrated in FIG. 7.

In step S4, as the cover is closed, the operation member pivots about the second fulcrum to pivot the switch about the first fulcrum in a second pivot direction (e.g., the pivot direction C2) as illustrated in FIG. 8.

In step S5, the switch slides over the slide aid mounted on the vibration isolating member mounted on the operation member as illustrated in FIG. 8. Alternatively, as illustrated in FIG. 44, the operation member 34 may slide over the slide aid 56A mounted on the vibration isolating member 45A mounted on the switch 33.

Accordingly, the pressure switching device, the image forming apparatus, and the pressure switching method suppress engagement of the switch or the operation member with the vibration isolating member.

According to the embodiments described above, the fixing belt 21 serves as a first rotator or a fixing rotator. Alternatively, a fixing film, a fixing sleeve, or the like may be used as a first rotator or a fixing rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A pressure switching device for switching pressure applied between a first opposed member and a second opposed member, the pressure switching device comprising:

a first fulcrum;

a switch to pivot about the first fulcrum, the switch to switch between a pressing state in which the first opposed member presses against the second opposed member with predetermined pressure and a pressure decrease state in which the first opposed member is disposed opposite the second opposed member with one of no pressure and decreased pressure smaller than the predetermined pressure between the first opposed member and the second opposed member;

a second fulcrum;

an operation member to pivot about the second fulcrum, the operation member to pivot the switch about the first fulcrum;

a slide aid to contact one of the switch and the operation member as the operation member moves toward the switch, the slide aid mounted on another one of the switch and the operation member; and a vibration isolating member interposed between the slide aid and said another one of the switch and the operation member, the slide aid having a hardness that is greater than a hardness of the vibration isolating member.

2. The pressure switching device according to claim 1, wherein the vibration isolating member is mounted on the operation member.

3. The pressure switching device according to claim 1, wherein the slide aid has a thickness that is smaller than a thickness of the vibration isolating member.

4. The pressure switching device according to claim 3, wherein the thickness of the vibration isolating member is not smaller than 1.0 mm and not greater than 3.0 mm, and wherein the thickness of the slide aid is not smaller than 0.1 mm and not greater than 0.3 mm.

5. The pressure switching device according to claim 1, wherein the vibration isolating member includes a material including urethane foam.

6. The pressure switching device according to claim 1, wherein the slide aid includes a material including polyethylene terephthalate.

7. The pressure switching device according to claim 1, wherein the one of the switch and the operation member contacts the slide aid with a contact width that is not smaller than a half of a width of the slide aid in a contact width direction that is perpendicular to a slide direction in which the one of the switch and the operation member slides over the slide aid and is perpendicular to a thickness direction of the slide aid.

8. The pressure switching device according to claim 1, wherein the operation member includes a scoop to press against the switch.

9. The pressure switching device according to claim 1, wherein the operation member includes a hook to pivot as the switch comes into contact with the hook.

10. An image forming apparatus comprising:

a first rotator;

a second rotator disposed opposite the first rotator; and a pressure switching device including:

a first fulcrum;

a switch to pivot about the first fulcrum, the switch to switch between a pressing state in which the first rotator presses against the second rotator with predetermined pressure and a pressure decrease state in which the first rotator is disposed opposite the second rotator with one of no pressure and decreased pressure smaller than the predetermined pressure between the first rotator and the second rotator;

a second fulcrum;

an operation member to pivot about the second fulcrum, the operation member to pivot the switch about the first fulcrum;

a slide aid to contact one of the switch and the operation member as the operation member moves toward the switch, the slide aid mounted on another one of the switch and the operation member; and a vibration isolating member interposed between the slide aid and said another one of the switch and the operation member, the slide aid having a hardness that is greater than a hardness of the vibration isolating member.

11. The image forming apparatus according to claim 10, further comprising:

an apparatus body accommodating the switch; and a cover mounting the operation member, the cover to open and close with respect to the apparatus body.

12. The image forming apparatus according to claim 10, wherein each of the first rotator and the second rotator includes one of a belt and a roller.

* * * * *